United States Patent
Geelen et al.

(10) Patent No.: US 9,772,229 B2
(45) Date of Patent: Sep. 26, 2017

(54) SPECTRAL CAMERA WITH INTEGRATED FILTERS AND MULTIPLE ADJACENT IMAGE COPIES PROJECTED ONTO SENSOR ARRAY

(71) Applicant: IMEC, Leuven (BE)

(72) Inventors: Bert Geelen, Leuven (BE); Andy Lambrechts, Herent (BE); Klaas Tack, Buggenhout (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 14/267,746

(22) Filed: May 1, 2014

(65) Prior Publication Data

US 2014/0267849 A1 Sep. 18, 2014

Related U.S. Application Data

(63) Continuation of application No. PCT/EP2012/071510, filed on Oct. 30, 2012.
(Continued)

(51) Int. Cl.
*H04N 9/07* (2006.01)
*H04N 5/225* (2006.01)
(Continued)

(52) U.S. Cl.
CPC .......... *G01J 3/2823* (2013.01); *G01J 3/0208* (2013.01); *G01J 3/0256* (2013.01); *G01J 3/0259* (2013.01);
(Continued)

(58) Field of Classification Search
CPC .......... G01B 9/02087; G01J 2003/1213; G01J 2003/2826; G01J 3/0297; G01J 3/06;
(Continued)

(56) References Cited

U.S. PATENT DOCUMENTS

| 5,479,015 A | 12/1995 | Rudman et al. |
| 5,729,011 A * | 3/1998 | Sekiguchi ................. G01J 3/14 250/208.1 |

(Continued)

FOREIGN PATENT DOCUMENTS

| WO | WO 2006/046898 | 5/2006 |
| WO | WO 2008/012715 | 1/2008 |

(Continued)

OTHER PUBLICATIONS

International Search Report dated Mar. 1, 2013 in International Application No. PCT/EP2012/071510.
(Continued)

*Primary Examiner* — Lin Ye
*Assistant Examiner* — Euel Cowan
(74) *Attorney, Agent, or Firm* — Knobbe Martens Olson & Bear LLP

(57) ABSTRACT

A spectral camera for producing a spectral output is disclosed. The spectral camera has an objective lens for producing an image, an optical duplicator, an array of filters, and a sensor array arranged to detect the filtered image copies simultaneously on different parts of the sensor array. Further, a field stop defines an outline of the image copies projected on the sensor array. The filters are integrated on the sensor array, which has a planar structure without perpendicular physical barriers for preventing cross talk between each of the adjacent optical channels. The field stop enables adjacent image copies to fit together without gaps for such barriers. The integrated filters mean there is no parasitic cavity causing crosstalk between the adjacent image copies. This means there is no longer a need for barriers between adjacent projected image copies, and thus sensor area can be better utilized.

20 Claims, 15 Drawing Sheets

Related U.S. Application Data

(60) Provisional application No. 61/555,946, filed on Nov. 4, 2011.

(51) Int. Cl.
*H04N 3/14* (2006.01)
*G01J 3/28* (2006.01)
*G01J 3/02* (2006.01)
*H04N 9/04* (2006.01)

(52) U.S. Cl.
CPC ...... *H04N 9/045* (2013.01); *G01J 2003/2826* (2013.01)

(58) Field of Classification Search
CPC ...... G01J 3/2823; G01J 3/0208; G01J 3/0256; G01J 3/0259; H04N 9/045
USPC ........ 348/267, 294–326, 335–336, 340, 342; 356/418, 419
See application file for complete search history.

(56) References Cited

U.S. PATENT DOCUMENTS

| | | | |
|---|---|---|---|
| 5,982,497 A | 11/1999 | Hopkins | |
| 7,242,478 B1 | 7/2007 | Dombrowski et al. | |
| 7,433,042 B1 | 10/2008 | Cavanaugh et al. | |
| 7,499,227 B2* | 3/2009 | Nurishi | G02B 7/282 359/697 |
| 7,652,765 B1 | 1/2010 | Geshwind et al. | |
| 2001/0024237 A1* | 9/2001 | Osada | H04N 5/232 348/273 |
| 2003/0123125 A1* | 7/2003 | Little | B81C 99/008 359/290 |
| 2004/0057144 A1* | 3/2004 | Lewis et al. | 359/891 |
| 2004/0136415 A1* | 7/2004 | Park | G02B 6/12004 372/20 |
| 2006/0055800 A1* | 3/2006 | Ackland | H04N 3/155 348/308 |
| 2006/0132781 A1* | 6/2006 | Imura | G01J 3/02 356/419 |
| 2006/0197949 A1 | 9/2006 | Bouzid et al. | |
| 2006/0292734 A1* | 12/2006 | Kim | H01L 27/14621 438/70 |
| 2007/0206241 A1 | 9/2007 | Smith et al. | |
| 2007/0206242 A1 | 9/2007 | Smith | |
| 2008/0123097 A1* | 5/2008 | Muhammed | G01J 3/02 356/419 |
| 2009/0073451 A1 | 3/2009 | TeKolste et al. | |
| 2010/0097491 A1* | 4/2010 | Farina | H04N 9/045 348/223.1 |
| 2011/0109768 A1* | 5/2011 | Nakahira | G03B 7/097 348/229.1 |
| 2012/0327248 A1* | 12/2012 | Tack | G01J 3/26 348/164 |
| 2013/0279006 A1* | 10/2013 | Song | G02B 1/10 359/584 |

FOREIGN PATENT DOCUMENTS

| | | |
|---|---|---|
| WO | WO 2011/064403 | 6/2011 |
| WO | WO 2013/064511 | 5/2013 |

OTHER PUBLICATIONS

Abtahi et al., "Large Scale Micro-Fabry-Perot Optical Filter Arrays," Enabling Photonics Technologies for Defense, Security, and Aerospace Applications VII, 2011, vol. 8054, 805406-1 to 805406-11.

"Hyperspectral Cameras," Middleton Research, Website Printout: http://www.middletonresearch.com/pdfs/, downloaded Apr. 10, 2014, pp. 6-27.

Gupta et al., "Development of a Miniature Snapshot Multispectral Imager," Army Research Laboratory, Sep. 2010, 34 pages.

Lambrechts et al., "Multispectral/Hyperspectral Imaging: CMOS Takes Hyperspectral Imaging Beyond the Laboratory," Laser Focus World, May 2011, vol. 47 Issue 5, 17 pages.

Mathews, "Design and Fabrication of a Low-Cost, Multispectral Imaging System," Applied Optics, Oct. 1, 2008, vol. 47, No. 28, pp. F71-F76.

Saari et al., "Novel Miniaturized Hyperspectral Sensor for UAV and Space Applications," Sensors, Systems and Next-Generation Satellites XIII, 2009, SPIE vol. 7474, 74741M-1 to 74741M-12.

"Survey of Hyperspectral and Multispectral Imaging Technologies," Research and Technology Organisation, North Atlantic Treaty Organisation, May 2007; ISBN 978-92-837-0071-5; 44 pages.

\* cited by examiner

SENSOR ARRAY 40
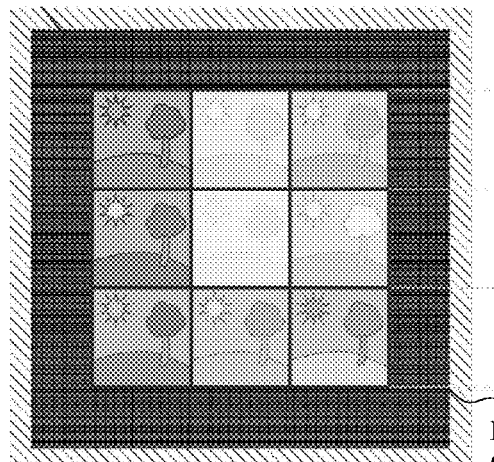
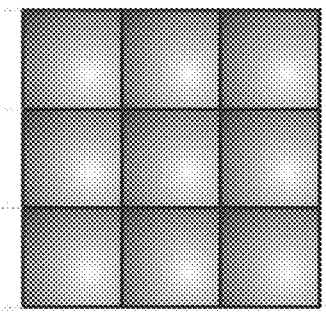
LENS ARRAY 25
READ OUT
CIRCUITRY
130
FIG 12
READ OUT
CIRCUITRY 130
FIG 13    LENS ARRAY 25
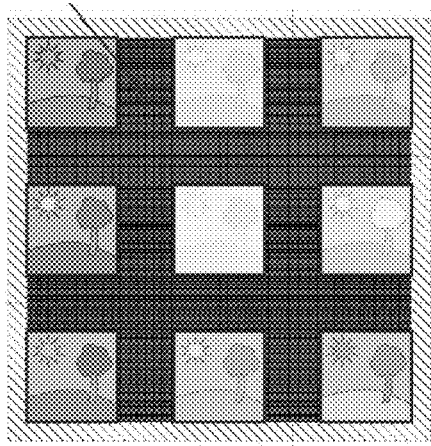
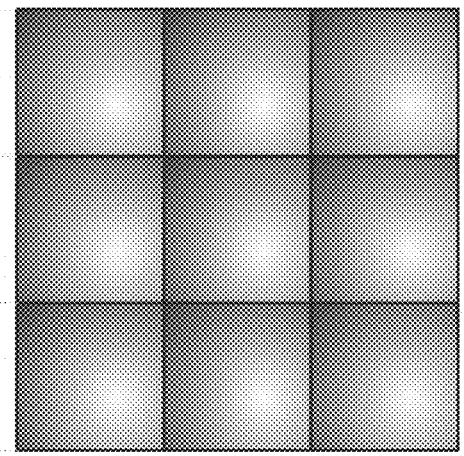

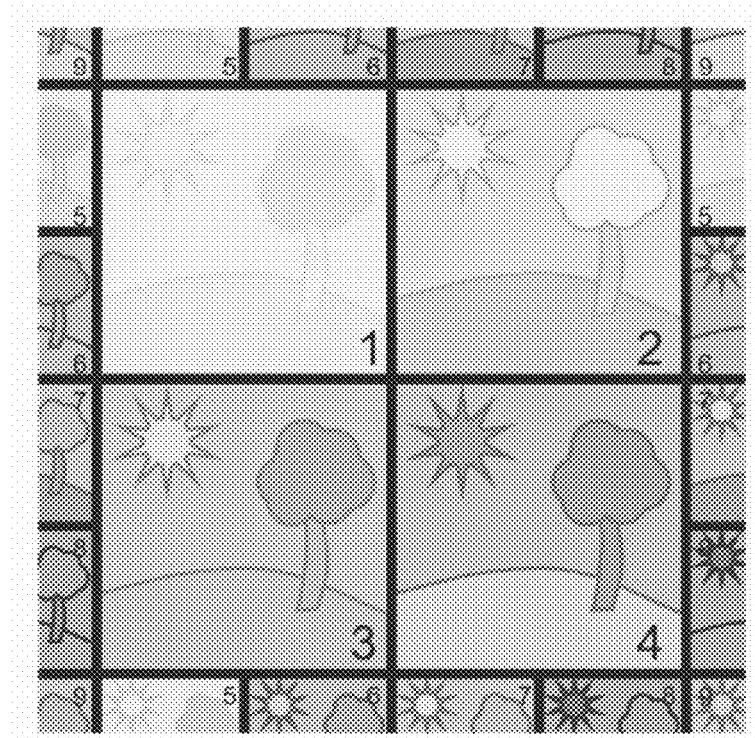
FIG 14
FIG 15
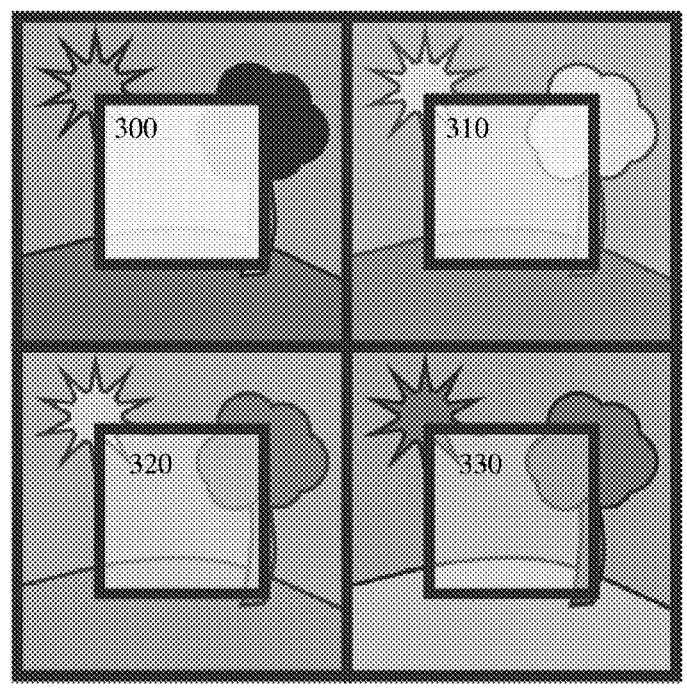

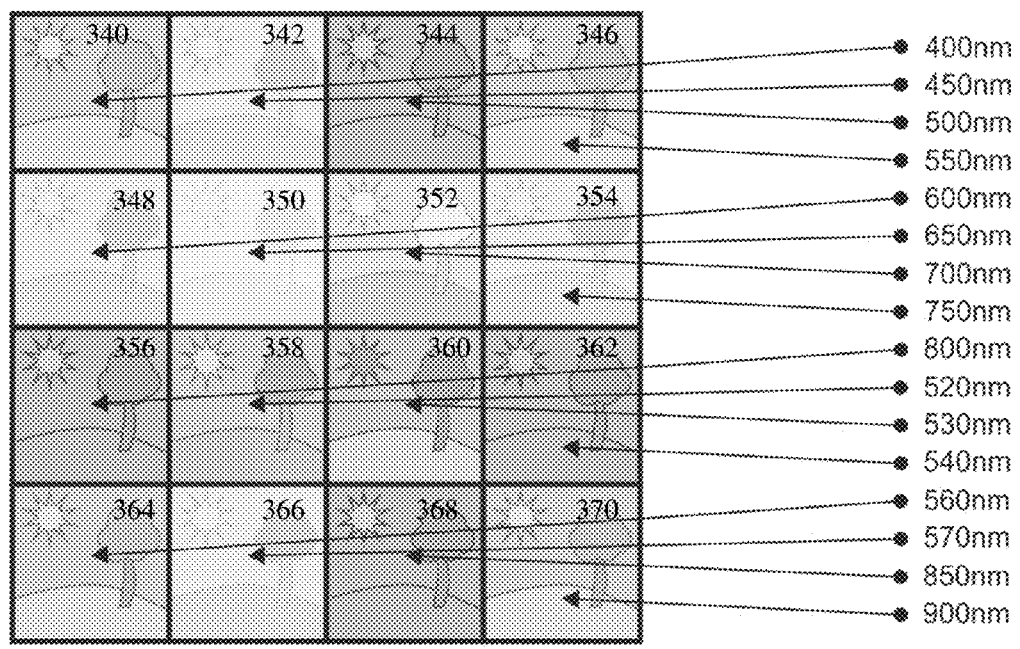
FIG 16
FIG 17
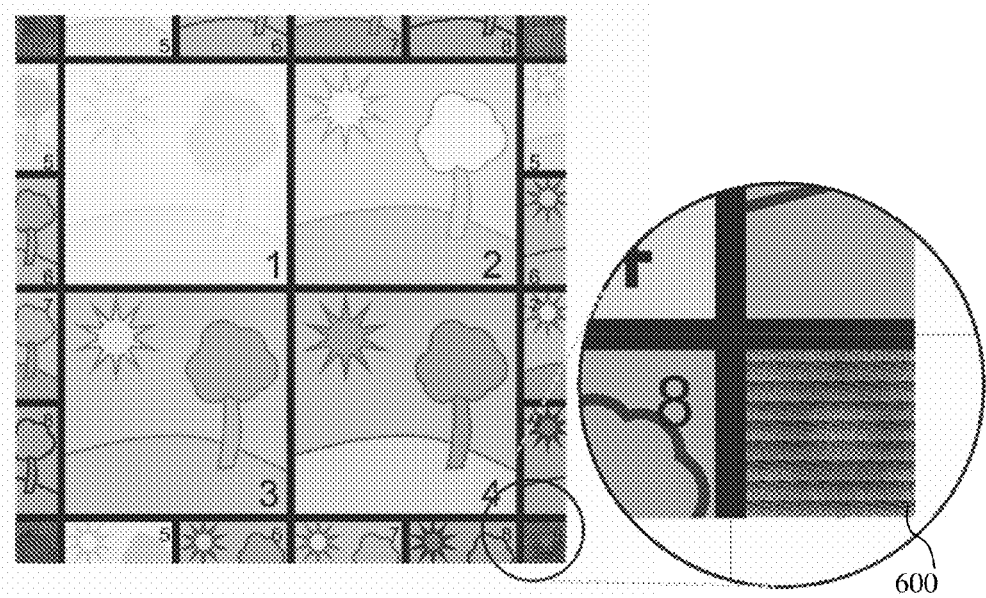

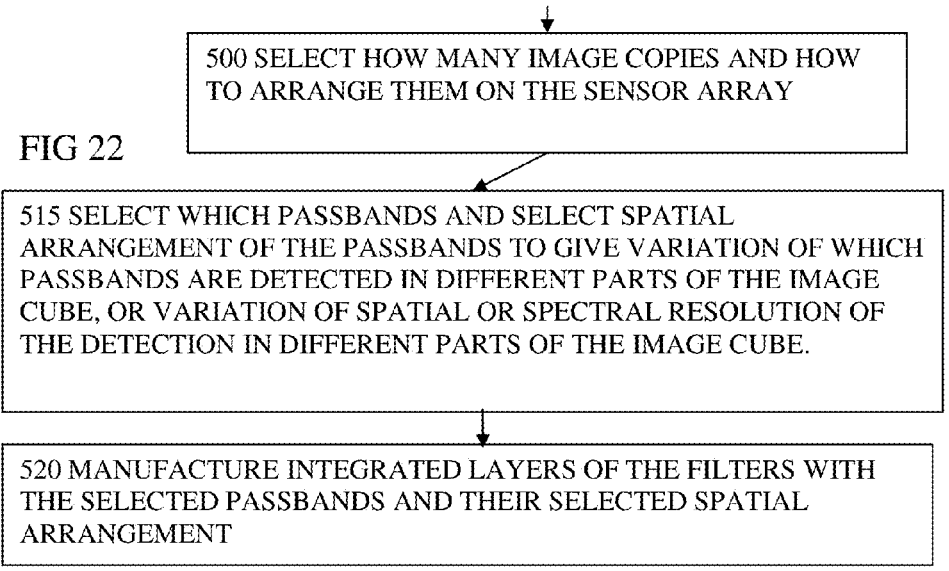
FIG 22
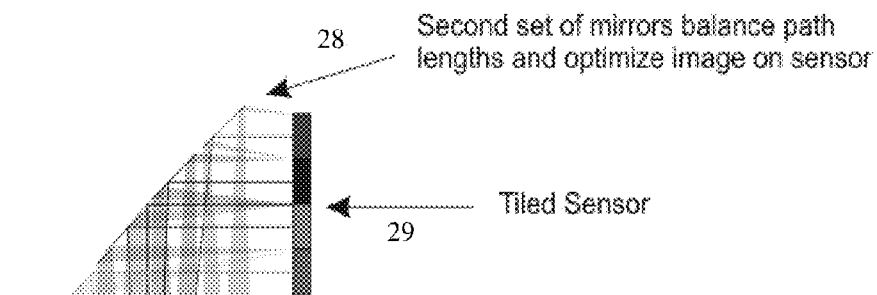
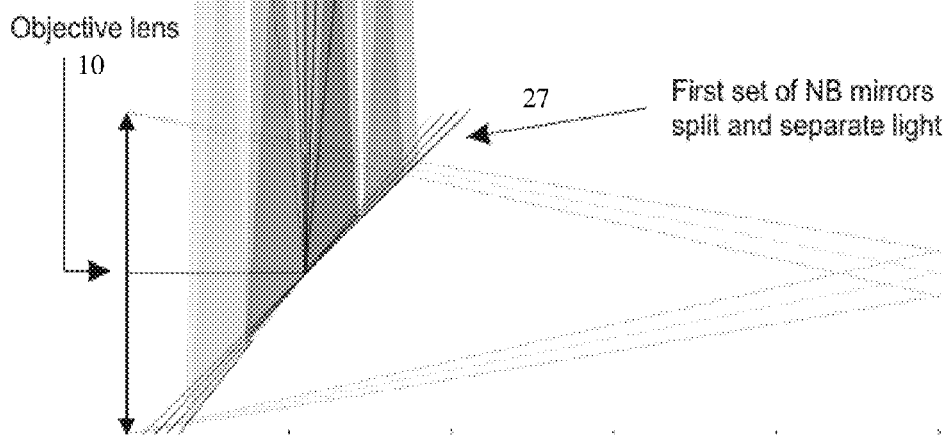
FIG 23

SPECTRAL CAMERA WITH INTEGRATED FILTERS AND MULTIPLE ADJACENT IMAGE COPIES PROJECTED ONTO SENSOR ARRAY

CROSS REFERENCE TO RELATED APPLICATIONS

This application is a continuation of PCT Application No. PCT/EP2012/071510, filed Oct. 30, 2012, which claims priority under 35 U.S.C. §119(e) to U.S. Provisional Patent Application No. 61/555,946, filed Nov. 4, 2011. Each of the above applications is hereby incorporated by reference in its entirety.

BACKGROUND

Technological Field

The present invention relates to spectral cameras, to methods of configuring such cameras, and to methods of operating such cameras.

Description of the Related Technology

Spectral cameras are known and some are referred to as multi spectral or hyperspectral imaging systems.

Hyperspectral imaging refers to the imaging technique of collecting and processing information from across the electromagnetic spectrum. Whereas the human eye only can see visible light, a hyperspectral imaging system can see visible light as well as from the ultraviolet to infrared. Hyperspectral sensors thus look at objects using a larger portion of the electromagnetic spectrum, as has been described at: http://en.wikipedia.org/wiki/Hyperspectral_imaging.

Certain objects leave unique "fingerprints" across this portion of the electromagnetic spectrum. These "fingerprints" are known as spectral signatures and enable identification of the materials that make up a scanned object. The hyperspectral capabilities of such an imaging system enable to recognize different types of objects, all of which may appear as the same color to the human eye.

Whereas multispectral imaging deals with several images at discrete and somewhat narrow bands, hyperspectral imaging deals with imaging narrow spectral bands over a contiguous spectral range. It can produce the spectra for all pixels in the scene. While a sensor with 20 discrete bands covering the VIS, NIR, SWIR, MWIR, and LWIR would be considered multispectral, another sensor with also 20 bands would be considered hyperspectral when it covers the range from 500 to 700 nm with 20 10-nm wide bands.

Hyperspectral sensors collect information as a set of "images." Each image represents a range of the electromagnetic spectrum and is also known as a spectral band. These images each have two spatial dimensions and if images of a series of different spectral bands are effectively stacked to form a cube, then the third dimension can be a spectral dimension. Such a three dimensional hyperspectral cube is a useful representation for further image processing and analysis. The precision of these sensors is typically measured in spectral resolution, which is the width of each band of the spectrum that is captured. If the scanner picks up on a large number of fairly narrow frequency bands, it is possible to identify objects even if said objects are only captured in a handful of pixels. However, spatial resolution is a factor in addition to spectral resolution. If the pixels are too large, then multiple objects are captured in the same pixel and become difficult to identify. If the pixels are too small, then the energy captured by each sensor-cell is low, and the decreased signal-to-noise ratio reduces the reliability of measured features.

Current hyperspectral cameras produce a hyperspectral datacube or image cube, consisting of a stack of 2D images in the x-y plane of the scene in which each image of the stack contains information from a different frequency or spectral band. The spectral range that is captured is not limited to visual light, but can also span Infra Red (IR) and/or Ultra Violet (UV). The 3D Image Cube is captured by a hyperspectral imager, using an array of sensors that is inherently a 2D sensor. Therefore some form of scanning can be used, so that the cube is assembled over a number of frame periods.

Line scanners or pushbroom systems thus capture a single line of the 2D scene in all spectral bands in parallel. To cover all spatial pixels of the scene, this type of system then scans different lines over time, for example by relative movement of the scanner and the scene. Starers or staring systems capture the complete scene in a single spectral band at a time with a 2D array of sensors and scan over different spectral bands in order to produce the 3D hyperspectral image cube.

It is known from the article entitled *Design and fabrication of a low-cost, multispectral imaging system* by Scott A. Mathews to provide optical duplication onto an array of sensors. Cross talk between image copies is limited by a physical barrier which covers some of the sensor elements. This was available at: http://faculty.cua.edu/mathewss/journals/Appl%20Opt%20V47%20N28%202008.pdf.

Another known device using such optical duplication is a "miniature snapshot multispectral imager" by Infotonics technology center. Again this avoids cross talk by having walls between the image copies on the sensor array.

SUMMARY OF CERTAIN INVENTIVE ASPECTS

An object of the invention is to provide improved apparatuses or methods.

A first aspect of the invention provides a spectral camera as set out in independent claim 1. This provides a spectral camera for producing a spectral output and having an objective lens for producing an image, an optical duplicator for producing optical copies of the image on different optical channels, an array of filters for passing a different passband of the optical spectrum for different ones of the optical channels, and one or more sensor arrays arranged to detect the filtered image copies simultaneously on different parts of the one or more sensor arrays, the camera also having a field stop for defining an outline of the image copies projected on the one or more sensor arrays, wherein the array of filters is integrated on the one or more sensor arrays, wherein the one or more sensor arrays has a planar structure without perpendicular physical barriers for preventing cross talk between each of the adjacent optical channels, and wherein the outlines and alignments of the projected image copies on the one or more sensor arrays are such that at least some adjacent ones of the projected image copies fit together without leaving sensors unused by being obscured by such barriers.

An effect of these features is that the combination of the field stop which provides better outline definition and the integrated filters which reduce the parasitic cavity between the sensors and the filters enables a reduction in crosstalk between the adjacent optical channels. This means there is no longer a need for barriers at the sensor surface between adjacent projected image copies. This means the projections of the image copies can now be larger since there is no need to leave a gap between adjacent projections. This enables an increase in utilization of sensor area and thus higher resolution. Also the lack of barriers can enable easier reconfiguration of the positions and outlines of the projected image copies if desired in use, since there is no need to match it to locations of physical barriers.

Any additional features can be added or disclaimed. Some are set out below. The array of filters can comprise thin films acting as fabry perot cavities having a thickness of half the wavelength of the desired transmission wavelength. This can enable first order operation giving better narrowband spectral shape, better reflection control, and less dependence on angle of incidence for example.

The array of the filters can be arranged such that for at least some of the image copies there is a spatial pattern of multiple different passbands within the part of the array for a respective image copy. Thus the pattern can be configured to even out or accentuate variations with spatial position of various parameters such as resolution, relative illumination and angle of incidence. See FIG. 4 for example.

The spectral camera can be arranged so that at least some of the projected image copies are complete unsegmented copies of the entire image. This helps avoid the need to restitch segments after sensing. See FIG. 3 for example.

The spectral camera can be arranged so that at least some of the projected image copies are segments of the entire image, and the camera has a digital processing part for electrically processing the detected segments to stitch them together. This enables more flexibility in how the segments are interleaved on different parts of the sensor array. See FIG. 6 and FIG. 7.

The optical duplicator can comprise an array of lenses. This can be better than planar mirrors as lenses can gather more light for example. See FIG. 2 for example.

The array of filters and the optical duplicator can be arranged to provide different magnification for different ones of the projected image copies. This enables different resolutions or image sizes. See FIG. 5 for example.

The spectral camera can be arranged such that the array of filters is reconfigurable in use by swapping the array of filters integrated on the sensor array to use a different sensor array having a different array of filters. This enables adapting to different applications needing different spectral bands or different spatial arrangement of the filters. See FIG. 8.

The field stop, the filters and the duplicator can be arranged to give the projected image copies a hexagonal outline. This can have a benefit of reducing a maximum radial distance from the center of each image copy to its periphery which helps reduce problems at the periphery of reduced illumination, increased angle of incidence and vignetting. See FIG. 9 for example.

The field stop can have a field lens. This means that more light can be redirected onto the lens array and hence reduce vignetting. See FIG. 11 for example.

The one or more sensor arrays can have a layout of circuit tracks in which these tracks are concentrated around the peripheries of the locations of the projections of the image copies. This can enable better utilization of the surface area of the sensor arrays since it enables the sensors within each image copy to be more concentrated. This enables for example a margin between different image copies to be provided which can enable the corresponding lenses to be made larger which can improve optical performance. See FIGS. 12 and 13 for example.

The camera can be arranged such that there is a variation in any one or more of: which passbands are detected at different parts of the image, a spectral resolution at different parts of the image, a spectral resolution at different parts of a spectral range, a spatial resolution of the detection at different parts of the image, and spatial resolution of the detection at different passbands. The passbands can be selected to enable part of the sensor array to detect a band corresponding to an unwanted higher or lower order spectral response of another part of the sensor array. This can enable such leakage to be compensated later, to enable more accurate spectral detection performance, or to enable the other filters to have more relaxed specifications or tolerances, to reduce costs for example.

A second aspect provides a method of operating a spectral camera having an objective lens for producing an image, an optical duplicator for producing optical copies of the image on different optical channels, an array of filters for passing a different passband of the optical spectrum for different ones of the optical channels, and one or more sensor arrays arranged to detect the filtered image copies simultaneously on different parts of the one or more sensor arrays, the camera also having a field stop for defining an outline of the image copies projected on the one or more sensor arrays, wherein the array of filters is integrated on the one or more sensor arrays, and wherein the one or more sensor arrays has a planar structure without perpendicular physical barriers for preventing cross talk between each of the adjacent optical channels, the method having the steps of: carrying out a preliminary registration to set the outlines and alignments of the projected image copies on the one or more sensor arrays such that at least some adjacent ones of the projected image copies fit tightly together without leaving sensors unused by being obscured by such barriers, reading out the projected image copies at the different passbands in a single frame time, and storing an image cube of the sensed projected image copies. In operation the ability to make full use of the sensor area without gaps for barriers helps enable greater spatial resolution. See FIG. 18 for example.

The method can include the step of swapping the sensor array integrated with the array of filters for one having a different array of filters. See FIG. 19 for example. The spectral camera can be arranged so that at least some of the projected image copies are segments of the entire image, and the method can have the step of electrically processing the detected segments to stitch them together. See FIG. 20 for example.

A third aspect provides a method of configuring a spectral camera during manufacture, the spectral camera having an objective lens for producing an image, an optical duplicator for producing optical copies of the image on different optical channels, the array of filters for passing a different passband of the optical spectrum for different ones of the optical channels, and one or more sensor arrays arranged to detect the filtered image copies simultaneously on different parts of the one or more sensor arrays, the camera also having a field stop for defining an outline of the image copies projected on the one or more sensor arrays, wherein the array of filters is integrated on the one or more sensor arrays, and wherein the one or more sensor arrays has a planar structure without perpendicular physical barriers for preventing cross talk between each of the adjacent optical channels, and wherein the outlines and alignments of the projected image copies on the one or more sensor arrays are such that at least some adjacent ones of the projected image copies fit together without leaving sensors unused by being obscured by such barriers, the method having the steps of: selecting how many image copies to provide and their spatial arrangement on the sensor array, selecting which passbands to use, and their spatial arrangement on the image copies, and manufacturing integrated layers on the one or more sensor arrays to form the array of filters according to the selected passbands and their spatial arrangement. Such configurability of the layout of the image copies and corresponding layout of filters at design time is made easier and more flexible by having integrated filters and by having more sensors available which results from having a field stop for delineating the image copies without the need for physical barriers. See FIG. 21 for example.

The selecting of the passbands and their spatial arrangement can be such that there is a variation in any one or more of: which passbands are detected at different parts of the image, a spectral resolution, a spatial resolution of the detection at different parts of the image, and spatial resolution of the detection at different passbands. This can be useful to enable different spectral ranges or different spectral resolutions to be covered, to provide more or less detail in different parts of the image cube. See for example FIGS. 14, 15, 16 and 17.

The selecting of the passbands and their spatial arrangement can be such that for at least some of the image copies a part of the array for a respective one of the image copies has a spatial pattern of multiple different ones of the passbands. An effect of this for optical performance parameters which vary with position, is that such finer granularity filter arrangement means that for example variations can now be spread more evenly over different passbands, or can be accentuated or diminished in selected passbands. Such position dependent parameters can include for example resolution, relative illumination and angle of incidence. See FIG. 4 for example.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 12 and 13 show two versions of a sensor array and a corresponding array of lenses, showing different arrangements of read out circuitry on the sensor array, FIGS. 14 to 17 show projected image copies with other arrangements of filters according to embodiments, FIGS. 21 and 22 show steps in methods of configuring such cameras during manufacture, FIG. 23 shows a schematic view of a spectral camera according to another embodiment with mirrors for optical duplication.

DETAILED DESCRIPTION

Figure 1:
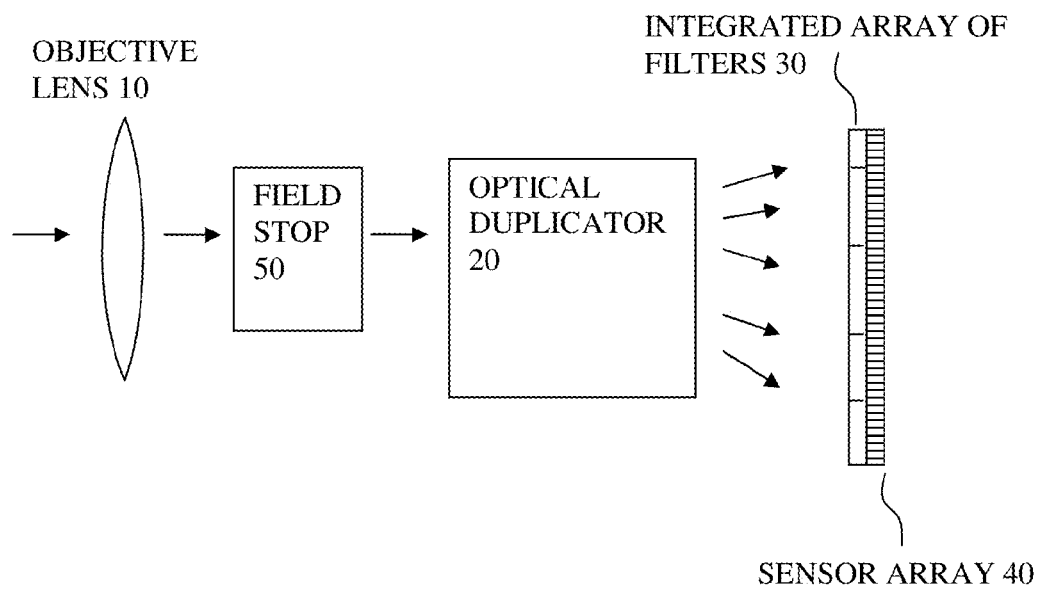
FIG. 1 shows a schematic view of a spectral camera according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an," "the," this includes a plural of that noun unless something else is specifically stated.

The term "comprising," used in the claims, should not be interpreted as being restricted to the means listed thereafter; it does not exclude other elements or steps.

Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to optical are intended to encompass at least wavelengths within the human visible wavelength range and also infra red wavelengths, and shorter wavelengths, extending into the ultra violet bands, where the sensitivity to manufacturing variations in thickness of the optical filter are even more pronounced. In some embodiments, the optical filters and optical sensors can be limited to a range which is any subset of these wavelengths, for example visible wavelengths only, or visible and shorter wavelengths.

References to arrays of optical filters or arrays of optical sensors are intended to encompass 2-dimensional arrays, rectangular or non rectangular arrays, irregularly spaced arrays, and non planar arrays for example.

References to integrated circuits are intended to encompass at least dies or packaged dies for example having the array of optical filters monolithically integrated onto the array of sensors, or devices in which the array of optical filters is manufactured separately and added later onto the die or into the same integrated circuit package.

References to a spectrum of wavelengths are intended to encompass a continuous spectrum or a range of nearly adjacent discrete bands for example.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments

Hyperspectral imaging systems or cameras can consist of different discrete components, e.g. the optical sub-system for receiving the incoming electromagnetic spectrum, the array of filters for creating the different bands within the received spectrum and the image sensor array for detecting the different bands. The optical sub-system can consist of a single or a combination of different lenses, apertures and/or slits. The array of filters can consist of one or more prisms, gratings, optical filters, acousto-optical tunable filters, liquid crystal tunable filters etc. or a combination of these.

A feature of spectral imaging is that, because an entire spectrum is acquired at each point, the operator needs no prior knowledge of the sample, and post-processing allows all available information from the dataset to be mined. Disadvantages are cost and complexity. Fast computers, sensitive detectors, and large data storage capacities are needed for analyzing hyperspectral data. Significant data storage capacity is necessary since hyperspectral cubes are large multi-dimensional datasets, potentially exceeding hundreds of megabytes.

Sensing spectral information is typically achieved either using dispersive optical elements or spectral filters. Dispersive optical elements such as prisms or gratings have limited light throughput and require time-consuming spatial scanning over multiple frames, as they sense only 1 spectral and 1 spatial dimension at a time. Spectral filters capture only 2 spatial dimensions (width W and height H) at one wavelength and thus require spectral scanning over multiple frames, requiring significant amounts of time due to the large switching overhead.

The filters on top of the sensor elements of the sensor array, enable the acquisition of 1 specific wavelength for each sensor element. In order to capture NB wavelengths using standard optics, the scene still needs to be scanned spatially in front of the sensor over NB frames such that each position is sensed using NB different filters. Acquiring the full cube in one frame period thus requires mapping all 3 dimensions of the cube on the 2 dimensions of the sensor, or likewise, each spatial point should somehow be duplicated NB times over the sensor array, such that the NB different spectral samples are sensed.

FIG. 1, Spectral Camera According to an Embodiment

Embodiments as described below can now enable higher-speed acquisition of the 3D HSI cube to enable snapshot imaging, by mapping each point in the W×H×NB-sized cube (where NB is the number of passbands) to a sensor on the sensor array more efficiently. Thanks to the integrated filters, which do not result in secondary cavities, a field stop alone can avoid spectral crosstalk, without the need for inefficient physical barriers. Each of the W×H spatial points sensed in the scene is optically duplicated NB times on the sensor, by positioning each of the NB image copies in the cube alongside each other on the 2D sensor. Due to the limited space on the sensor, there will be a trade-off between spatial and spectral resolution. Hence it is more important in such devices to make the best use of the sensor array.

FIG. 1 shows a schematic view of a camera according to an embodiment. An objective lens 10 is followed by a field stop 50, and an optical duplicator 20 for providing multiple image copies projected onto a sensor array 40. An array of filters 30 is integrated on the sensor array. The optical duplication can be realized by relaying the light of an objective lens onto the sensor through NB optical channels, each consisting of 1 (single or compound) lens system or mirrors. The NB lens (systems) can be judiciously placed to ensure the correct positioning of the NB duplicated scene copies on to the NB filter tiles. The field stop is used to form the bounds of the scene image so that the duplicated images can be positioned on the 2D sensor array closely packed yet without this leading to crosstalk.

The optical duplicator relays an image formed by the objective lens, and duplicates it multiple times on the sensor. This setup allows direct physical access to the original image formed by the objective lens to add a field stop and achieve the desired image outlines on the sensor. It is also feasible to select an objective lens with an internal field stop, but this would reduce the flexibility in selecting different commodity objective lenses. Another option is to place a field stop before the objective lens, even outside of the camera, in the scene itself, but this will typically require a less practical, physically larger field stop.

It is desirable to have the array of filters integrated with the image sensor array. This integrated component or module can be combined with an optical sub-system to form a complete camera system. The sensor array is typically an integrated circuit with a monolithically integrated array of filters, and can be referred to as a spectral unit. The problem of long acquisition time can be partially overcome using high light throughput integrated filters formed for example by a HSI wedge technology as set out in International Patent Publication No. WO2011064403, entitled "Integrated circuit for spectral imaging system" and assigned to IMEC. Practical commercial implementations of such cameras should be compact, be capable of manufacture at low cost, and be reconfigurable. In certain aspects, process technology aspects are combined with the system integration and image processing techniques to alleviate the integrated circuit manufacturing process requirements.

Figure 2:
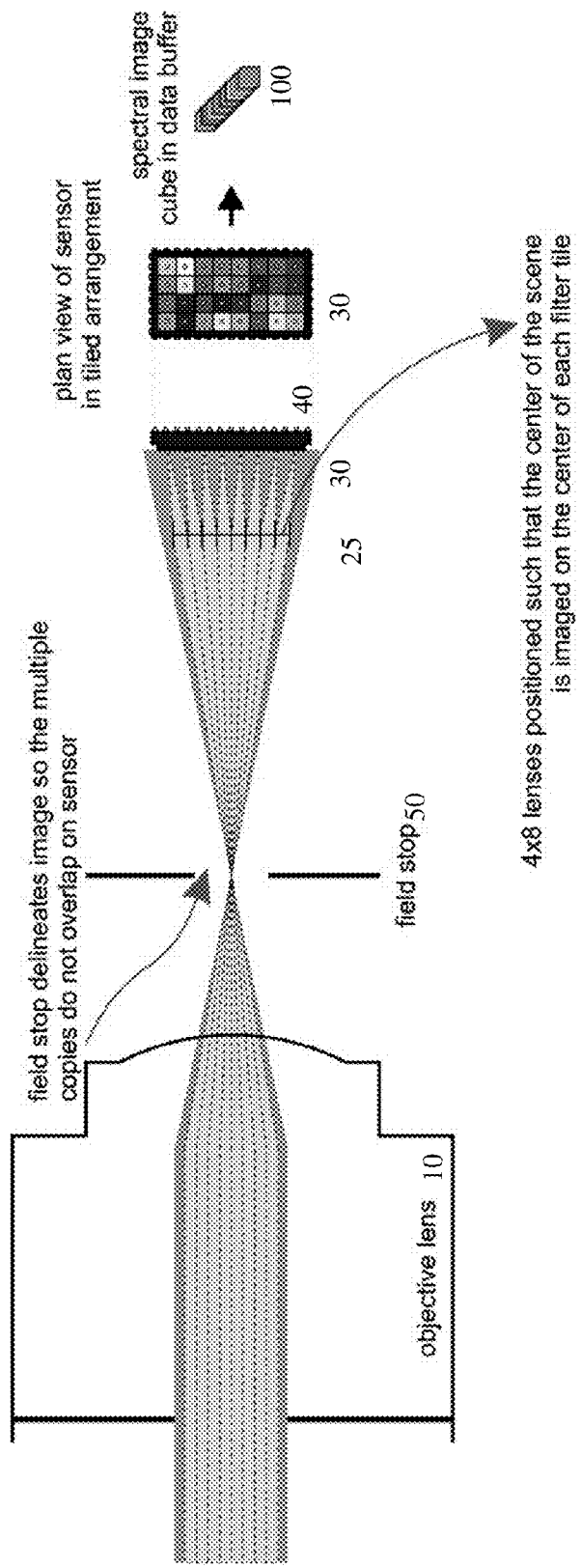
FIG. 2 shows a schematic view of a spectral camera according to another embodiment.

FIG. 2, Spectral Camera According to Another Embodiment

FIG. 2 shows a schematic view of a spectral camera according to another embodiment, similar to that of FIG. 1 and showing a particular implementation with more detailed representation of the light paths and the effects of a set of lenses 25 for carrying out the optical duplication. There is also a plan view of the image copies on the sensor array and a representation of the image cube 100, stored in a data buffer after read out from the sensor array. As before there is an objective lens 10 followed by a field stop 50. The optical duplicator is implemented here by an array of lenses 25, arranged so that the incoming light from the objective lens is divided into NB optical channels, 1 per band. This produces a tiled layout of the image copies on the sensor array. The filters in this case are shown as consisting of 1 large filter tile per band. As shown there are 32 image copies in a 4 by 8 rectangle, though of course there can be fewer or more such copies and they do not need to be rectangular or grouped in a rectangle. The band-specific optical channels can each have a single lens or compound lenses, to relay light from the objective lens onto its target tile. Compound lenses allow higher optical throughput (speed) as well as wider field of view and higher resolution. These optical channels need not have the same area nor have the same magnification. They should be judiciously placed to relay the objective lens image NB times on to the sensor so that the NB images fit tightly without overlapping (=crosstalk), i.e. by mapping the center of the scene to the center of each filter tile. This places further constraints on the shape of the objective image, which can be met using a field stop at the objective image plane. Vignetting of the light relayed from the objective light beam by the NB optical channels must also be avoided, either by limiting the field height in function of the position and combined height of the NB optical channels, or by adding a field lens at the objective image plane, which bends the objective light beam on to the NB optical channels.

The NB optical channels are placed at a fixed position in front of the sensor. Thanks to the use of standardized lens mounts, the objective image will always be located at a fixed distance relative to the start of the lens mount (i.e. the FFD or "flange focal distance" of the lens mount) and relative to the optical channels/tiled sensor. This allows modifying the focal length of the objective lens (to realize zooming) and refocusing the objective lens. This can result in modified objective light beam shapes, and thus vignetting, but appropriate measures may be taken to avoid this (field lens, repositioning of filter masks at pixel level to compensate vignetting through the sensitivity of the specific tile filter).

Some effects of the arrangement shown are as follows:
The objective lens enables zooming and refocusing flexibility.
It is compatible with standard lens mounts, potentially reducing costs.
Full sensor array area usage is theoretically possible using tuned field stop and lens system positioning, since no barriers between image copies are needed.
No restitching of segments of image copies is needed, at most registration between tiles may be needed.
Good optical performance (high resolution, wide FOV, high light throughput) can be achieved particularly if compound lens systems are used.

Figures 3, 4:
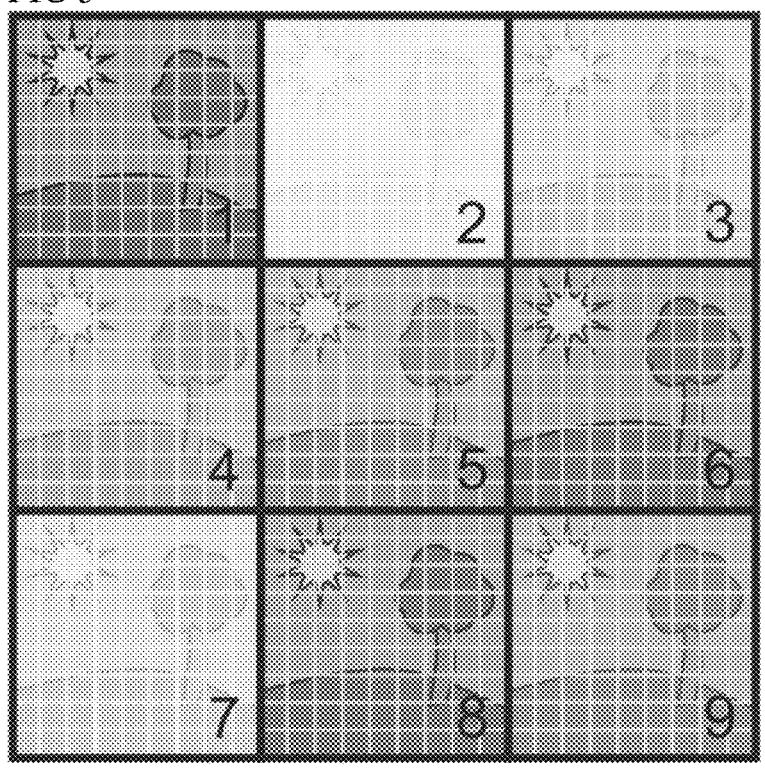
FIGS. 3 to 5 show views of projected image copies with different arrangements of filters.
Figure 5:
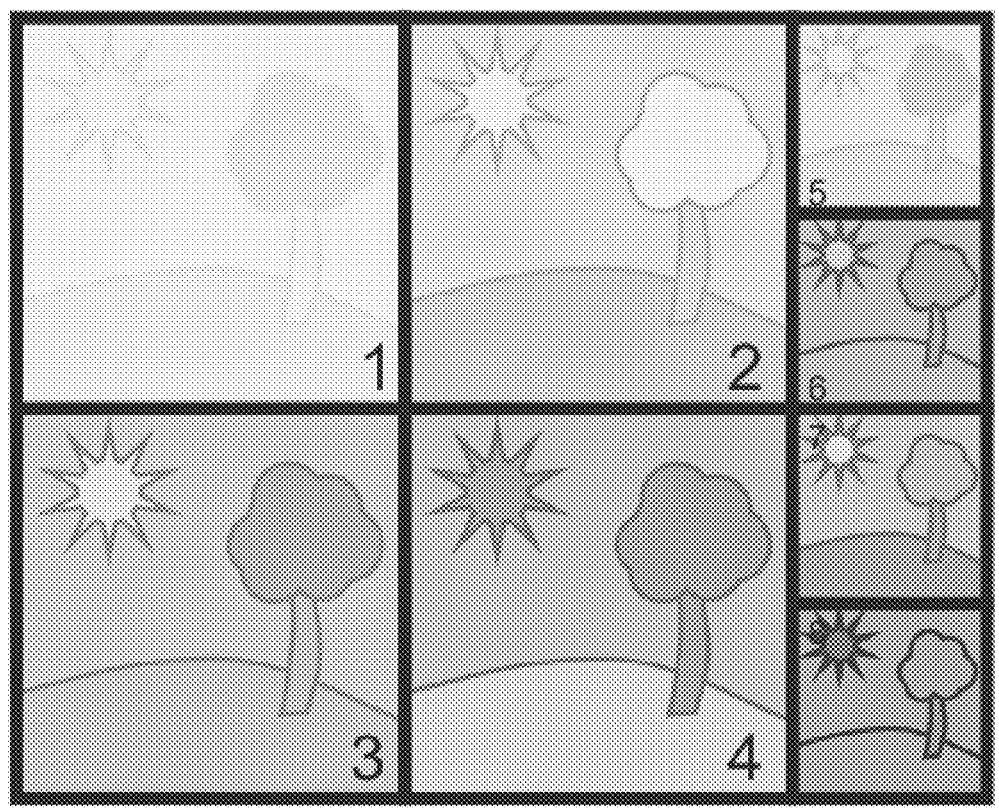

FIGS. 3 to 5, Projected Image Copies with Different Arrangements of Filters

FIGS. 3 to 5 show views of projected image copies with different arrangements of filters. In FIGS. 3 and 4 there are nine bands marked as 1 to 9 and arranged in a 3×3 grid. A single filter is provided for each image copy in FIG. 3. In FIG. 4, there is a finer granularity pattern of filters for each of the image copies, in this case each image copy has nine smaller filters, and for each band there are nine smaller filters spread across different ones of the image copies. They are arranged in this case so that there is full coverage in all nine bands of the entire image. Notably the arrangement is made so that the smaller the number of the band, the closer to the center are its nine constituent filters. So band 1 is most central, and band 9 has the corner positions furthest from the center. This may be appropriate if band 1 is most important and band 9 least important, or at least is tolerant of distortions which increase away from the center such as those dependent on angle of incidence or light level for example. No change in the lenses is needed for FIGS. 3 and 4 since the image copies remain in the same positions. Restitching of the images for each band can be carried out after read out from the sensor array, if it is desired to have complete images for each band, as described below with reference to FIG. 6.

FIG. 5 shows a further arrangement in which there are 8 bands and the image copies of bands 5 to 8 are smaller than those of bands 1 to 4, by a factor of 2 in terms of height. This means their corresponding light paths through lenses or mirrors are arranged to have a different magnification. The filters will have corresponding areas.

Design for Optical Fall-Off and Module Sensitivity

When designing the integrated module, consisting of both the image sensor array and the filter structure, cross-component optimizations can be done. For modules targeting low-cost and/or compact systems, lower quality optics can be expected. One effect which can be tackled in this context, is vignetting. Vignetting is a reduction of an image's brightness or saturation at the periphery compared to the image center. When this effect is coupled to the wavelength dependent efficiency of the Fabry-Perot filter and image sensor, both effects can be co-optimized in order to flatten the wavelength dependent behavior, instead of strengthening it.

Vignetting causes the light intensity to drop from the center towards the sides of the image. The effect of the intensity fall-off can be compensated for by the illumination, as is known to those skilled in the art, by the use of so-called illumination profiles. Both effects, vignetting and sensor sensitivity, affect the efficiency of the module for a certain arrangement of the filters. In order to flatten the sensitivity and overcome this additive behavior of both effects, a suitable choice of arrangement of the filters and the design of the array of lenses can be made that takes both effects into account. This can be combined with illumination profiles, if needed, and when the application permits.

As has already been discussed in the foregoing paragraphs, one part of the design of the hyperspectral imaging module, is the arrangement of the different filters over the image sensor array. In general, the design process can be split into the following parts:

1. selection of the targeted wavelength ranges,
2. selection of an image sensor array for that range,
3. selection of the targeted spectral sampling (and spectral resolution),
4. design of the image copies by designing the array of lenses and field stop, and
5. design of the different Fabry-Perot filters and their arrangement in the array.

Figure 6:
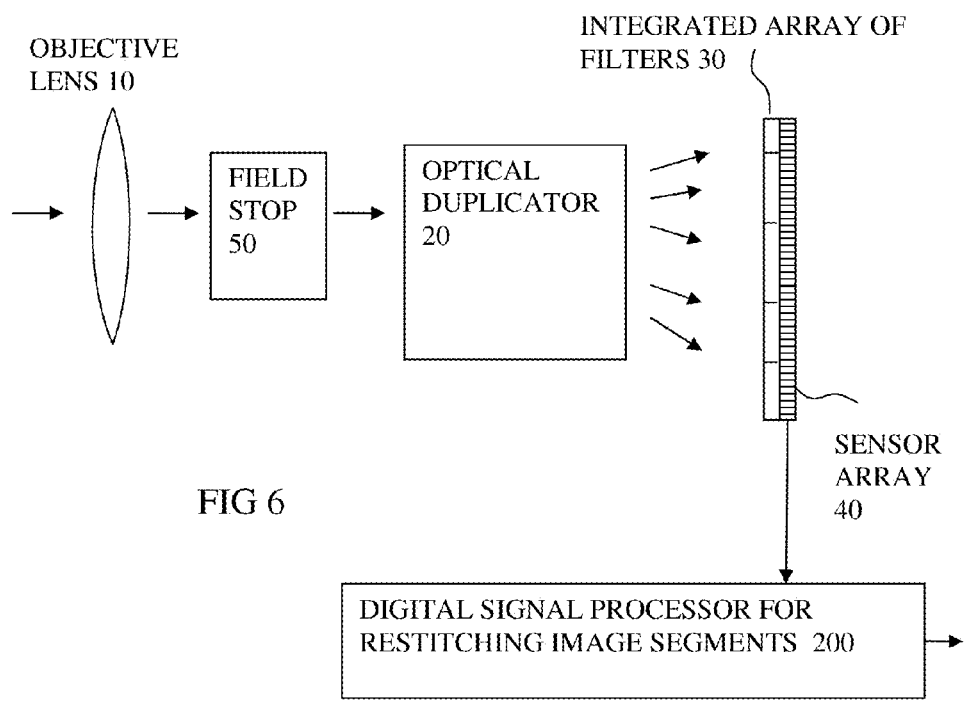
FIG. 6 shows a schematic view of a spectral camera according to another embodiment with a processor for restitching.
Figure 7:
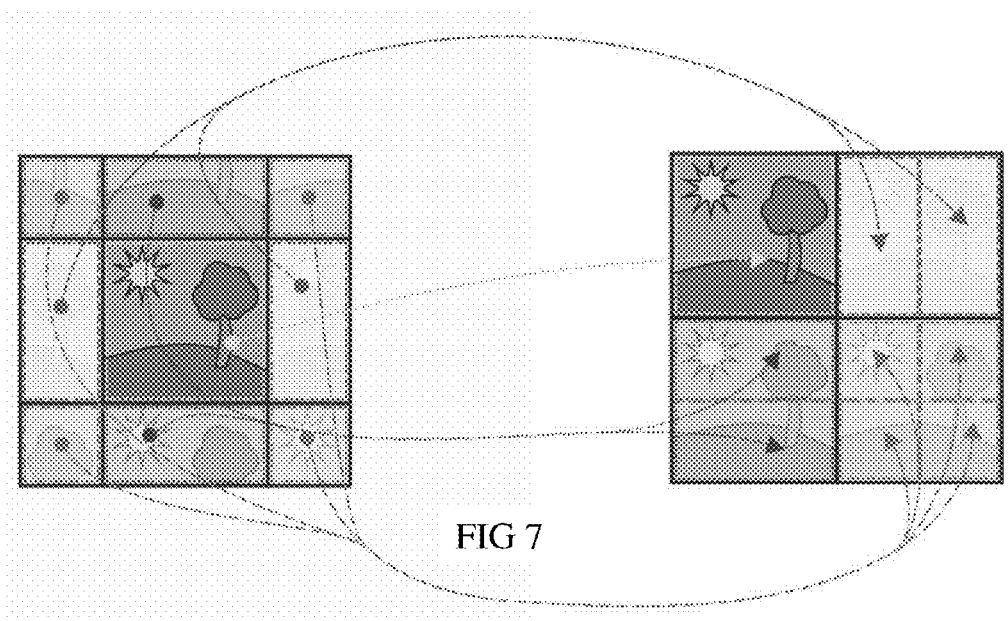
FIG. 7 shows a view of projected image copies before and after restitching.

FIGS. 6 and 7, Processor for Restitching

FIG. 6 shows a schematic view of a spectral camera according to another embodiment similar to that of FIG. 1 with the addition of a processor 200 for restitching, after read out of the sensor array. The processor can be incorporated into the camera or can be part of an external image processing system for example. This could be used to restitch the parts of the images for each band read out from the sensor array for the arrangement of filters represented in FIG. 4. The processor can be implemented in the form of an address generator for a frame buffer, arranged so that as the sensor array is read out into a data buffer, suitable addresses are generated to store the parts of the image for one band in addresses corresponding to a single frame, as if it had been restitched. An example is that the read out corresponding to FIG. 4 could be stored at addresses which correspond to locations in a pattern as shown in FIG. 3, or as an image cube of complete images.

FIG. 7 shows a view of projected image copies before and after restitching according to another example. In this case there are four image copies and three of them are in parts around the periphery. These parts are restitched into three complete images as shown by the arrows.

Figure 8:
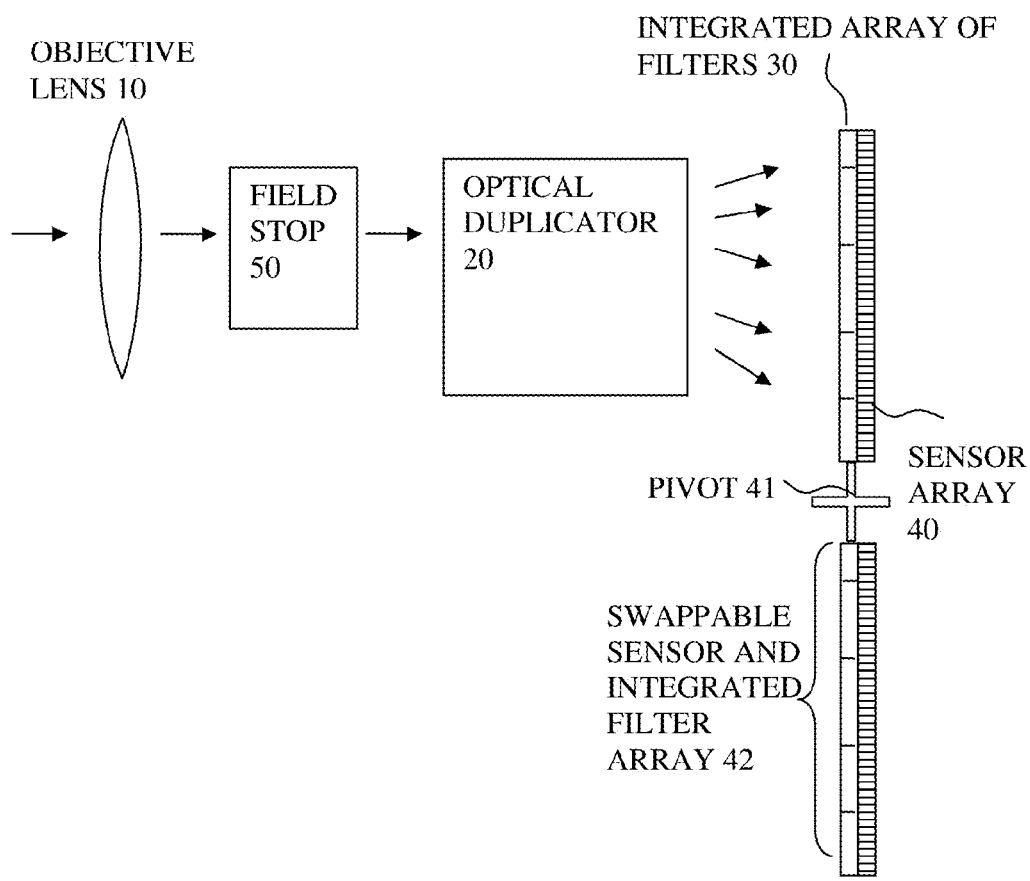
FIG. 8 shows a schematic view of a spectral camera according to another embodiment with a swappable sensor array with integrated filters.

FIG. 8, Swappable Sensor Array to Change Integrated Filters

FIG. 8 shows a schematic view of a spectral camera according to another embodiment similar to that of FIG. 1 and with a swappable sensor array 42 with integrated filters. In this case the swapping can be implemented by rotating the swappable sensor array about a pivot 41, so that it takes the position of the original sensor array 40. In principle other arrangements are conceivable. For example the optical path could be moved to the swappable sensor array rather than moving the sensor array, or the swappable array could be slid rather than rotated. Any number of different sensor arrays could be fixed to the pivot. In some cases, if needed, the optical duplicator such as a lens array could also be swapped if needed, so that the layout of image copies or their magnifications could be changed. In some cases the field stop might also need to be changed, though this could be implemented as a separate mechanism.

Figure 9:
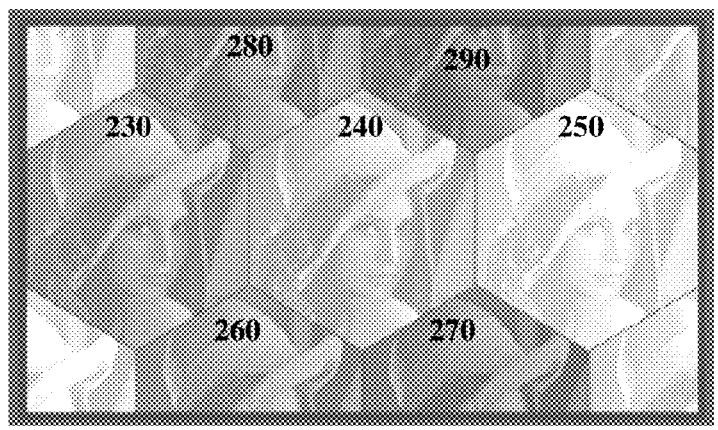
FIG. 9 shows a view of hexagon shaped image copies on hexagon shaped filters.

FIG. 9, Hexagon Shaped Image Copies

FIG. 9 shows a view of hexagon shaped image copies on hexagon shaped filters. This shows three complete hexagon shaped image copies 230, 240, and 250, and a number of half image copies, 260, 270, 280, and 290. The half copies and even the corner copies could be restitched to make complete images at different bands.

Figure 10:
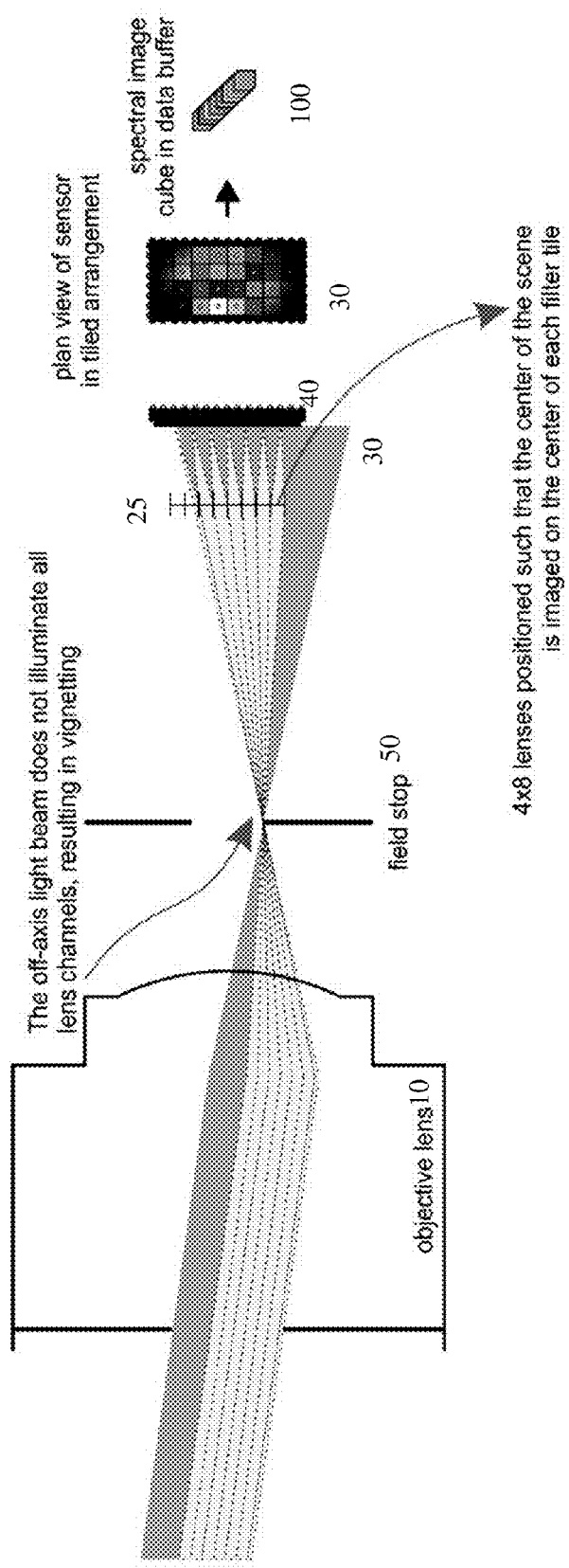
FIGS. 10 and 11 show schematic view of spectral cameras according to another embodiment without and with a field lens.
Figure 11:
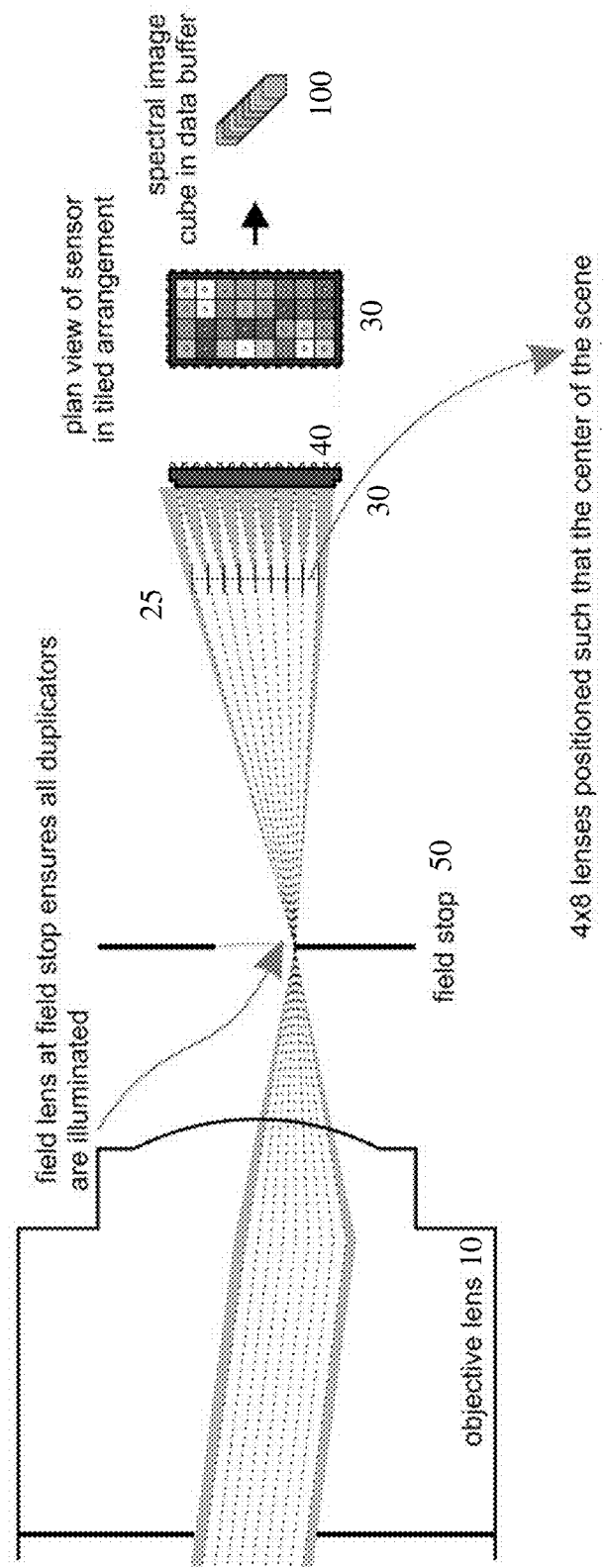

FIGS. 10 and 11, Spectral Cameras without and with a Field Lens

FIGS. 10 and 11 show schematic view of spectral cameras according to another embodiment similar to that of FIG. 2 without and with a field lens respectively, at the field stop location. FIG. 10 shows that an off axis light beam does not illuminate all of the optical channels. This leads to vignetting, in that optical channels near the center receive more light than those at the periphery. FIG. 11 shows the effect on the light paths if a field lens is provided and shows that more of the off axis light is redirected onto the optical duplicator and thus the optical channels are more evenly illuminated.

FIGS. 12 and 13, Arrangements of Read Out Circuitry on the Sensor Array

FIGS. 12 and 13 show two versions of a sensor array and a corresponding array of lenses, showing different arrangements of read out circuitry on the sensor array. In FIG. 12, the read out circuitry 130 is arranged around the edges of the sensing elements and the sensing elements have no gaps in between for the read out circuitry or other circuitry. In contrast in FIG. 13, the sensing elements are spread out so that such circuitry is routed in between the image copies where the sensing elements are moved apart. This has the notable effect that the corresponding lenses in the lens array 25 can be made larger since the image copies are spaced apart slightly. This still falls within the concept of the adjacent ones of the image copies fitting together without leaving sensor elements unused since the gap in this case has no sensor elements.

FIGS. 14 to 17, Projected Image Copies with Other Arrangements of Filters

FIGS. 14 to 17 show projected image copies with other arrangements of filters according to embodiments. In FIG. 14, the image copies are arranged so that there are four complete images in bands marked 1 to 4, and parts of images in bands 5 to 9 arranged around the periphery. These parts are shown at half size, which means the magnification of their optical channels is lower. In FIG. 15 there are four complete image copies and the arrangement of filters is such that the center of each image, 300, 310, 320, and 330 there is a different band. In FIG. 16 there are 16 complete image copies, 340, 342, 344, 346, 348, 350, 352, 354, 356, 358, 360, 362, 364, 366, 368 and 370, arranged in a 4×4 grid with one band for each image copy. As shown, the bands range from 400 nm to 900 nm with a spectral resolution in steps of 50 nm, with a special change in such spectral resolution to use steps of 10 nm between 520 nm and 570 nm. Thus there is high spectral resolution in one part of the spectral range, simply by choice of bands.

FIG. 17 shows projected image copies similar to those of FIG. 14 with other arrangements of filters according to embodiments. The bottom right hand corner 600 is shown in an enlargement showing that there is a finer pattern of different filters in this corner, the pattern having filters at the same spatial granularity as the sensor elements. This is therefore a mosaic type pattern. The spectral resolution or range is higher than the rest of the image copies, for example having 64 bands, compared to the 8 bands of the rest of the sensor array. As there will be greater pitch between detections at the same band, by a factor of 8 in this case, this means less spatial resolution. Hence this is an example of a variation in spatial resolution at different spatial positions. As this can lead to aliasing, then some anti aliasing in the optical domain should be carried out, by homogenizing or blurring the image across the many bands of each repeat of the mosaic pattern.

Figure 18:
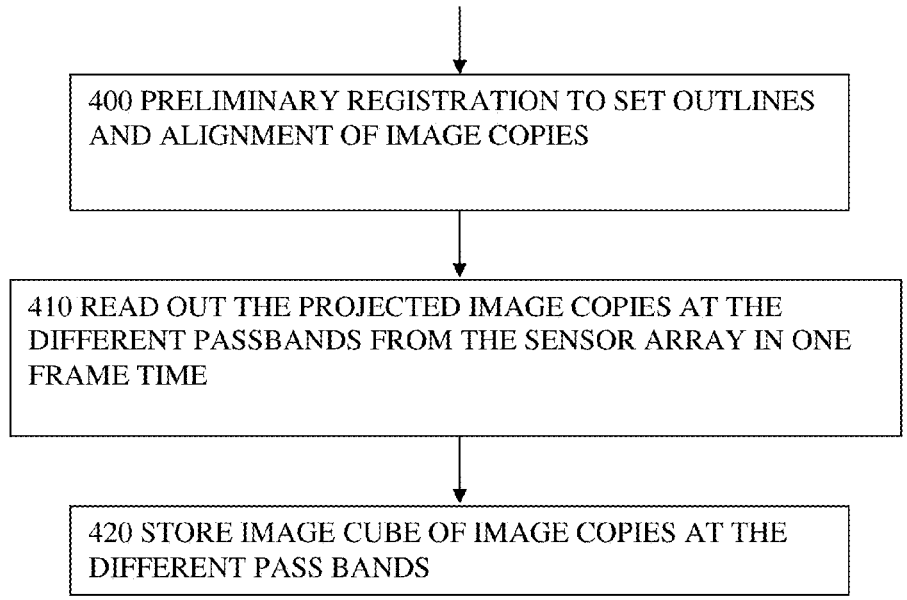
FIGS. 18 to 20 show steps in methods of operation of the cameras.
Figure 19:
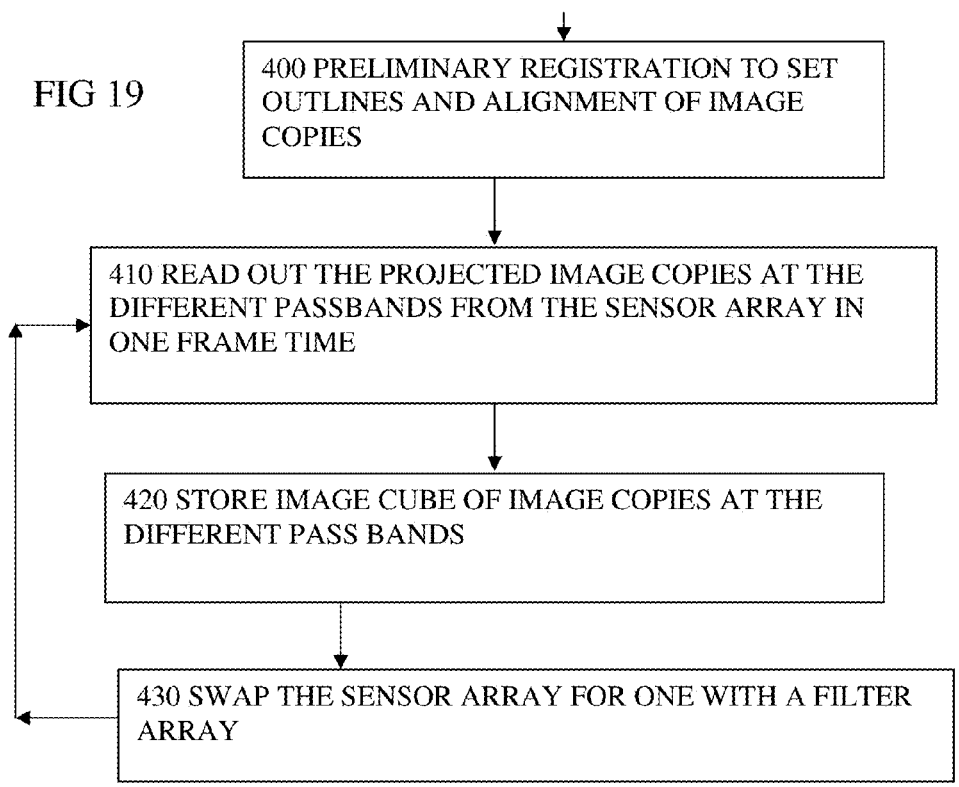
Figure 20:
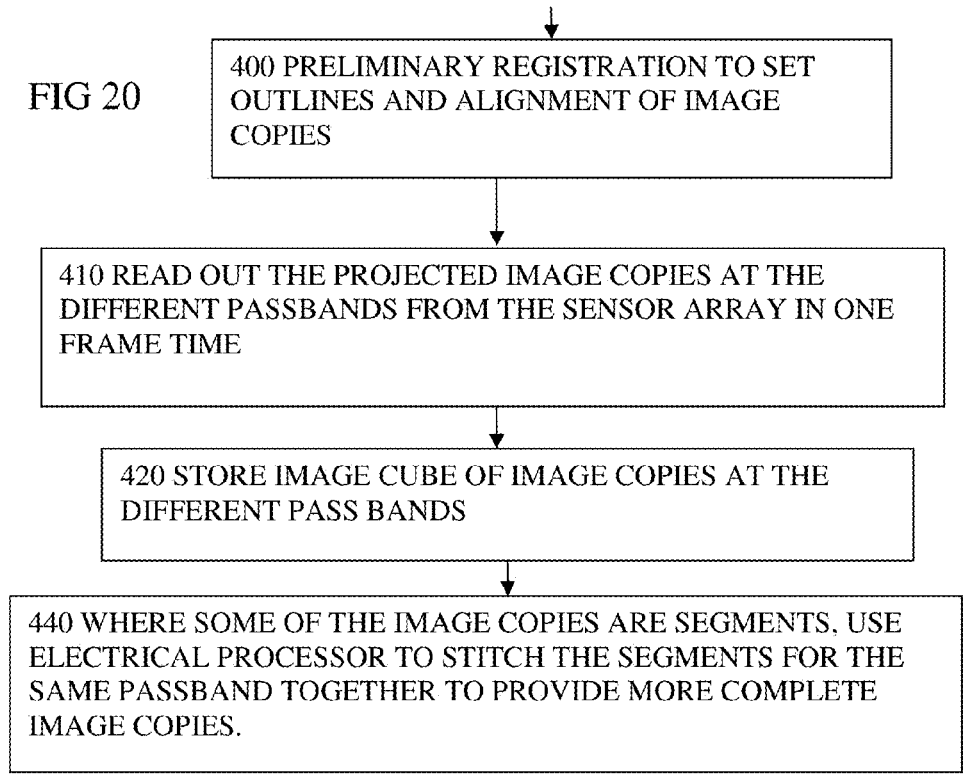

FIGS. 18 to 20, Steps in Methods of Operation of the Cameras

FIGS. 18 to 20 show steps in methods of operation of the cameras. In FIG. 18, a first step 400 is preliminary registration to set outlines of the image copies, for example by mechanical adjustment of the objective lens or of the field stop, or of the location of the sensor array. Step 410 is the read out from the sensor array of the detection signals of the projected image copies at the different passbands, in one frame time. Step 420 is storing these signals as values in a database to represent the image cube for that instant, or for a number of instants. FIG. 19 is similar to FIG. 18 with the addition of the step 430 of swapping the sensor array for one with a different array of filters. FIG. 20 is similar to FIG. 18 with the addition of the step 440 of restitching using the processor as described above in relation to FIGS. 4, 6 and 7.

With any of the embodiments described, there can be additional sampling over multiple frame times if a spatial scanning mechanism is used to change the field of view or the angular position of the view in consecutive frame periods. This can extend the image cube or make it more dense in the spatial directions.

Figure 21:
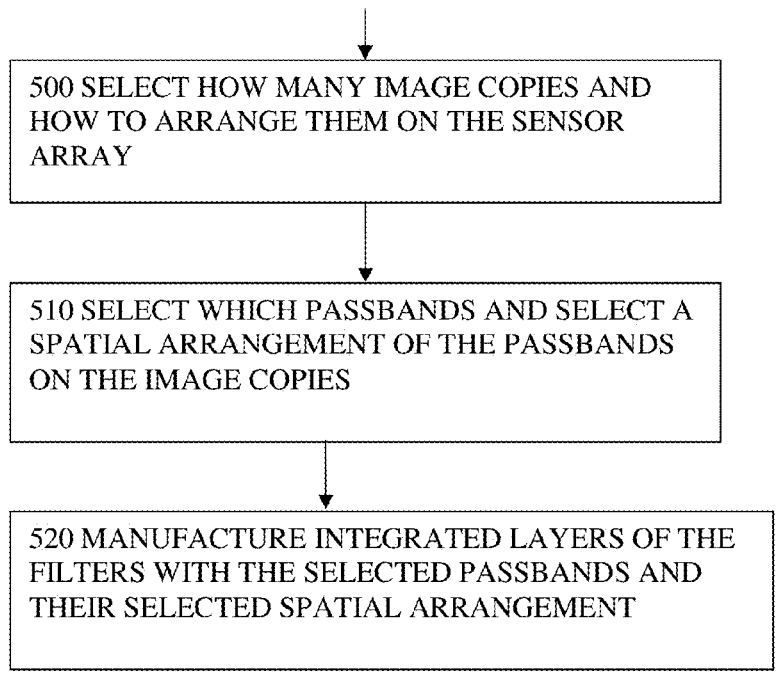

FIGS. 21 and 22, Methods of Configuring Cameras During Manufacture

FIG. 21 shows steps in methods of configuring such cameras during manufacture, with step 500 showing a first step of selecting how many image copies to provide and how to arrange them on the sensor array. Step 510 shows selecting passbands and selecting the spatial arrangement of the passbands on the image copies. Step 520 shows manufacturing the layers of the integrated filters according to the passbands and their spatial arrangement. FIG. 22 is similar to FIG. 21 except that step 510 is replaced by step 515 in which the selection of passbands and their spatial arrangement is such as to have some variation of which passbands are detected in different parts of the image cube, or variation of spatial or spectral resolution of the detection in different parts of the image cube. This may involve the spatial pattern having a finer granularity than the image copies, so for a part of the array of filters for a respective one of the image copies there is a spatial pattern of multiple different ones of the passbands.

FIG. 23, Spectral Camera with Mirrors for Optical Duplication

FIG. 23 shows a schematic view of a spectral camera according to another embodiment with mirrors for optical duplication. This design can use the same filter layout as others described above, using lenses. The mirrors can be used instead of lenses to separate the NB optical channels. Mirrors can be flat so as not to introduce aberrations, so the image quality is determined by the objective lens. Since there are no lenses to refocus light, the objective light cone is reduced by at least NB for each channel. The first set of NB mirrors 27 are positioned as close to the objective aperture as possible (to reduce vignetting) and orient the NB sets of light away from the objective. Each of the individual mirrors in set 1 are positioned and oriented so the deflected beams for different target tiles are separated, allowing the mirrors in the second set 28 to reflect their specific beam without any crosstalk. A second set of mirrors is positioned to balance the NB optical paths so each subimage comes into focus on the correct depth and position of the sensor array 29 (and its filter tiles). In principle the filters can be integrated on the sensor array or elsewhere such as on the mirrors.

Figure 24:
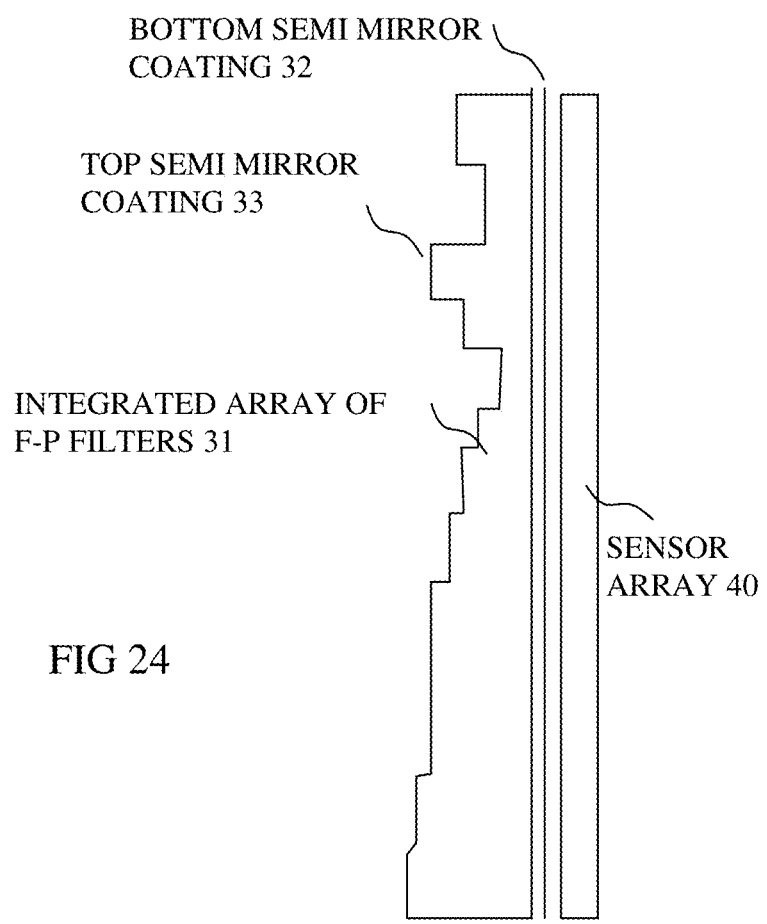
FIG. 24 shows a cross section view of a sensor array integrated with an array of Fabry Perot filters.

FIG. 24, Integrated Fabry Perot Filters

FIG. 24 shows a cross section view of a sensor array 40 integrated with an array of Fabry Perot filters 31. This has a top semi mirror coating 33 and a bottom semi mirror coating 32. Although gaps are shown between the parts, this is for clarity and in practice there would be no gaps. More details of examples of this part are now set out.

Semiconductor Processing

The array of filters can be integrated with the image sensor array using semiconductor process technology, i.e. the spectral unit is post processed on the substrate comprising the image sensor array using semiconductor process technology and process steps. Examples of such semiconductor technology are Complementary-Metal-Oxide-Semiconductor (CMOS) processing, whereby the image sensor array is a CMOS sensor, and Charge-Coupled-Device (CCD) processing, whereby the image sensor array is a CCD sensor. These manufacturing techniques are ideally suited for producing integrated electronic circuits. Such monolithic integration allows manufacturing at low cost while offering a higher performance as no interface layers are needed to attach the spectral unit to the substrate. Hence stray light effects are considerably reduced.

Given the large range of technology generations, one can choose to manufacture the sensor in a lower cost technology having a large critical dimension (CD), e.g. 130 nm, resulting a larger pixels and smaller spatial resolution of the image sensor array. Alternatively one can choose to manufacture the image sensor array in a state in a higher cost technology having a smaller critical dimension (CD), e.g. 45 nm, resulting a smaller pixels and higher spatial resolution of the image sensor array.

The image sensor array can be a front-illuminated sensor, whereby the array of filters is post processed on top of the substrate comprising the sensor. Optionally this substrate is thinned afterwards thereby removing the bulk of the substrate and leaving a thin slice containing the image sensor array and the spectral unit monolithically integrated therewith. Alternatively the image sensor array can be a back-illuminated sensor, whereby first the substrate comprising the sensor is thinned from the backside onwards. On backside the thinned substrate the spectral unit is then post processed.

Although any order of Fabry-Perot filters can be manufactured and used, preferably only 1st order Fabry-Perot filters are formed on the image sensor array thereby reducing the complexity for removing and/or blocking higher order components. A monolithically integrated hyperspectral imaging system with a 1st order Fabry-Perot filter array typically does not require a focusing lens in the optical subsystem.

Examples of complete hyperspectral imaging systems comprising the optical subsystem and the monolithically integrated array of filters and image sensor array are disclosed. These complete imaging systems exploit from the benefits of the monolithically integration to allow freedom in designing the optical subsystem.

The design of the filters, e.g. the thickness which defines the cavity length of the filters, can take into account the location of the particular filter on the chip to reduce the dependency on variations in the incident angle of the incoming electromagnetic spectrum.

The filter is post-processed on top of an image sensor array and every filter is aligned with the rows or columns of the image sensor array.

The filters can be monolithically integrated, meaning that the filter structures are directly post-processed on top of the image sensor. This integration has very important advantages and some consequences, compared to filter structures that are separately produced and then assembled with the imager later. Advantages of monolithic integration are cost reduction through standard CMOS production steps, reduction in stray light, allow design for first order and avoid the need for a focusing lens.

When compared to a hybrid integration, in which the filter structures are separately produced and then assembled with the image sensor into the hyperspectral module, there are some advantages to a monolithic integration. Firstly, the combination of both production sequences into one combined flow leads to an overall simplification and cost reduction in the production, when compared to a hybrid integration of the filter structures that are separately produced and then later assembled with the sensor into the module. This is especially the case for this filter, as the post-production of the filter structures requires only CMOS compatible fabrication steps, like deposition, patterning and etching. By adding these steps to the normal production flow of the image sensor, expensive, error prone and labor intensive assembly steps are prevented. For example, for a filter with 3 layers of oxide and amorphous silicon in a Bragg stack and 127 different thicknesses in the cavity, around 50 lot-turns are needed, giving an additional cost of more or less 20% with respect to standard CMOS imagers. The number of lot turns for the deposition of the top and bottom mirror layers can even be reduced if the different layers can be deposited, one after the other, in the same tool.

Secondly by manufacturing the filter structure directly on top of the pixels of the imager, photons can pass directly from the filter into the pixel below. In the case of front side illuminated sensors, photons will first pass through the metallization layers and some dielectric layers. When the filter structure is produced separately and stacked on top of the image sensor, there will always be a non-functional layer or gap in between both structures.

Even when the filter and substrate combination is flipped and the filter is located in between the supporting substrate and the image sensor, the light will pass through the substrate first, then through the filter and finally through a thin air or glue gap, before it hits the image sensor photodiodes. When a filter structure is combined with an image sensor, be it stacked on top of each-other with air or glue between the different layers, this extra substrate between the filter structure and the underlying rows of pixels will always give rise to a certain amount of performance degradation because of:

1. Cross Talk

Photons that exit the filter structure above a certain pixel can cross the gap and fall onto a neighboring pixel. This effect will be heavily reduced when the gap is reduced or completely removed by a direct postprocessing of the filter onto the pixels. There can still be some cross-talk as a result of the thickness of the filter itself however, as a photon that enters the filter above one pixel can still propagate through the filter and fall onto a neighboring pixel. This is reduced by designing thinner filters and by controlling the angle of incidence.

2. Stray Light

The extra non-functional layer gives rise to extra reflections on its boundaries if the refractive indices are not matched and therefore to extra stray light on top of the cross-talk discussed above. By reducing the effective distance S between the filter and the pixel array of the image sensor for different incident angles stray light is reduced. For a smaller distance S, e.g. 1 nm, the distance that is traveled by the stray light (D) is well within normal pixel dimensions (e.g. 1 to 15_m). This is not the case for more macroscopic integration distances, e.g. 1 mm substrate, in which case the distance of the traveled light D ranges over tens to hundreds of pixels, leading to a severe deterioration of the spatial and spectral resolution. In some cases, the distance D can become so large, an additional focus lens is required to focus the light back onto the pixel.

3. Parasitic Fabry-Perot Arising Because of the Stray Light

Additionally, as indicated in the previous item, the dielectric stack and metals on top of the photodiodes reflect part of the light. Together with the gap because of the heterogeneous integration and the bottom mirror of the cavity, this forms a parasitic Fabry-Perot interfering with the actual one. This process can be optimized with the monolithic integration as the dielectric layers in the imager become part of the bottom Bragg stack, made in similar materials (e.g. oxide) and which is not very sensitive to the width of these layers.

One important reason why the hybrid filter structures that are post-production assembled onto the image sensors suffer from this problem, is the fact that the construction of very thin filter structures separately, requires the additional insertion of a (transparent) support structure to mechanically support the filters and enable the stacking. When this layer is placed between the filter and the image sensor, the non-functional gap consists of this layer and an additional air or glue gap in between the support layer and the image sensor. When the support structure is placed on top, it can also generate additional reflections and should be optimized separately (e.g. by adding anti-reflective coatings), but still there will be an air or glue layer in between the filter and the image sensor. All of this can be made redundant by post-processing the filter structures directly on top of the image sensor, as has been discussed above.

A third advantage is that the monolithic integration, combined with very precise CMOS fabrication techniques, enables the construction of filter structures with much smaller thicknesses. As discussed later, the Fabry-Perot filter structure is designed to select a certain wavelength by tuning the cavity length. Thinner filters are less sensitive to the incident angle, as the internal reflections in the filters cover less distance for non-perpendicular incidence. A thicker filter will suffer from a larger displacement D of the transmitted beams, ranging well over 10 mm. This leads to a severe reduction in spatial and spectral resolution, as the light that passes through the filters will fall onto other rows or columns of pixels. This macroscopic filter hence requires a focusing lens. The thin filters are much less sensitive to this and the displacement D stays in most cases below the pixel dimensions, i.e. preferably in the 1 to 10 nm range, for all but the largest angles of incidence and the smallest pixels sizes. Traditional production techniques, in combination with hybrid integration of the filter structure and the image sensor, can not reach the required accuracy to fabricate Fabry-Perot filters of the first order. Hence, higher order Fabry-Perot structures have to be used. In that case, additional dichroic or other filters have to be added to the module, in order to select the required order only. This gives rise to additional energy loss, additional costs and hence reduced overall system optimality.

Finally, when a Fabry-Perot filter is placed some distance away from the image sensor, the output of the filter exhibits phase differences that, when focused by a lens, take on the form of concentric circles. The concentric circles are a result of the different interfering waves where you have at different locations constructive and destructive interference. The focusing lens is needed for macroscopic filters because of the large distances covered by reflections inside the filter and in order to focus all these reflections back onto one pixel. In the disclosed integrated imaging module, the distance between the filter structure and the image sensor is very small and as the filter is designed for the first order, there is no need for a focusing lens. Thin filters don't need this focusing lens, because internal reflections cover much smaller distances and in the case of the proposed filter, all light still falls in one pixel (after a very large number of internal reflections, the energy that is left in the light ray that exceeds the size of a single pixels is negligible). The concentric circles that are the result of the phase difference, will still be there, but will all be focused inside the same pixel and their effect is all integrated in the output of that pixel.

The direct post-processing of the filter structure on top of an active IC, in this case the image sensor, should be compatible with the contamination, mechanical, temperature and other limitations of that IC. This means that, for example, none of the steps used in the fabrication of the filter can use materials or processing steps that would damage the image sensor below.

As will be discussed below, one of the most important limitations is the restriction on the available materials, taking into account the CMOS production environment. In the proposed filter, the material selection has been done such that standard materials have been used, that are fully compatible with standard processing. Using some materials is not possible, e.g. Au or Ag, as they tend to diffuse into the different layers and into the tools and thereby negatively affect the yield of the current and even future processing steps. In some cases, such a layer can still be acceptable as a final step (top layer), when the deposition is done outside of the normal processing line and when the tool is only used for that purpose. This can only be done as a final step, as the wafer can not enter the normal flow after this operation. Another limitation, related to the material selection, is the temperature budget or the temperature window that is still available for processing. In order to perform the post-processing without damaging the image sensor. To prevent damage, the maximal temperature of the processing steps should not exceed a certain maximum, e.g. 400 degrees C. This also restricts the choice of materials and crystallization that is available for the design. With respect to a hybrid approach, where the image sensor and a separately produced filter structure are assembled into a module later, there is less freedom here. In case of a monolithic design, the restrictions have to be taken into account throughout the design. If certain design choices can be made during the design of the image sensor itself, to relax the constraints on the processing of the filter (e.g. to raise the allowed temperature for post-processing), this can be taken into account too. This then leads to an optimization problem at the module level, instead of for the image sensor and the filter structures separately. The restriction on the filter structures always apply, as it is processed later and on top of the image sensor.

Fabry-Perot Filter

Every pixel of the image sensor can have its own optical filter, sensitive to one specific wavelength. The organization of different optical filters on the sensor depends on its usage. Different types of filters exist which can be integrated, such as dichroic filters. The type that is used in the examples described is the Fabry-Perot Interferometer.

A Fabry-Perot filter is made of a transparent layer (called cavity) with two reflecting surfaces at each side of that layer. Fabry-Perot wavelength selection involves multiple light rays within the cavity being reflected, which results in constructive and destructive interference, based on the wavelength of the light, on the distance l between the semi-mirrors and on the incident angle θ. (b) Higher orders are also selected, which results in an order selection problem. The filter operation is based on this well-known Fabry-Perot principle, in which the height of each filter is selected to be tuned to the desired passband. Each filter is formed by a resonant cavity of which the resonance frequency is determined by the height of the filter. On the top and bottom of the cavity, a semi-transparent mirror is placed to partially reflect the light ray. Because of the reflections, an optical path difference is introduced resulting in destructive and constructive interference (depending on the incoming wavelength). More details of the principles and characteristics of such filters are set out in above mentioned International Patent Publication No. WO2011064403.

Design of the Optical Filter

Reflecting Surfaces:

The design and performance of the reflecting surfaces on both sides of the cavity are crucial to the performance of a Fabry Perot optical filter. A Fabry-Perot optical filter with high finesse, and thus good spectral resolution, can only be obtained by using highly reflective mirrors. A second important parameter of the mirrors is their absorption, as this will determine the efficiency of the filter. If a full range of Fabry-Perot optical filters has to be constructed over a certain wavelength range, it is beneficial that these two parameters (reflectivity and absorption) stay as constant as possible over this spectral range. In that case, the wavelength range can be covered/sampled by varying only the cavity length of the Fabry-Perot filters and the materials and mirror layers can be kept constant. The selected wavelength range has to match the sensitivity of the selected image sensor, which is the second component of the module.

Current solutions proposing monolithic Integration use specific non-standard sensor designs, increasing the cost or decreasing the speed. Switching to CMOS compatible processing steps on CMOS sensors raises integration issues as it has consequences on, for example, the material selection, due to contamination and temperature budget. Metals like Ag for the bottom mirror can not be used. State of the art Fabry-Perot filters needs to use Al, causing a serious decrease of the filter quality or optical throughput (speed). Dielectric stacks are preferred but the contamination level and temperature budget limits the material selection. Process compliant materials needed having the correct combination of n/k to obtain the needed spectral range in the selected frequency range. An example of these dielectric materials having low n material is $SiO_2$, possibly tuned to decrease n even further. An example of a high-n material is amorphous silicon, with reduced absorption index because of process parameter tuning, e.g. temperature and hydrogen content. Hard oxides have better tolerances but cannot be used because of the need for higher temperatures than allowed by standard CMOS processing.

An example of such alternative mirror system is a (distributed) Bragg stack, which is formed by combining two types of dielectrics into an alternating stack of two or more materials: one with a low refractive index and one with a high refractive index. A first characteristic of a Bragg stack is its bandwidth, as given by Equation 1, i.e. the spectral range $\Delta\lambda_o$ over which the reflectivity is more or less constant.

$$\Delta\lambda_0 = \frac{4\lambda_0}{\pi}\arcsin\left(\frac{n_2 - n_1}{n_2 + n_1}\right) \quad (1)$$

From this equation, it can be seen that the bandwidth $\Delta\lambda_o$ depends on both the central wavelength $\lambda$, and the refractive indices $n_1$, $n_2$ of the selected materials. To be able to cover a wide spectral range, around a certain central wavelength (e.g. 600 nm spectral range around 700 nm), a big difference between n1 and n2 is needed. From the list of materials that are used in standard semiconductor processing, $SiO_2$ has one of the lowest refractive indices (1.46) and a very low absorption coefficient. Both parameters are stable over a very large spectral range. For a spectral range of 600 nm around a central wavelength of 700 nm (the VNIR range), this means that the second material in the Bragg stack will ideally need to have refractive index equal to 6.4, in addition to an absorption coefficient as close as possible to 0. There is no such ideal material available in the standard IC processing materials, compatible with the process flow, and adapting existing materials for a better refractive index and lower absorption is needed. The refractive index of $SiO_2$ can be lowered by making it porous (mix it with air, which has a refractive index of 1). This results in a need for better manufacturable refractive index equal to 5 for the same spectral range and central wavelength. Another example of material engineering is lowering the absorption index of amorphous silicon by changing process (deposition) parameters, like temperature, concentration of hydrogen, etc.

$$R = \left[\frac{n_0(n_2)^{2N} - n_s(n_1)^{2N}}{n_0(n_2)^{2N} + n_s(n_1)^{2N}}\right]^2 \quad (2)$$

As indicated by Equation 2, the reflectivity R of such a Bragg mirror is easily controlled by the number of pairs of dielectric layers. The more layers, the higher the reflectivity and the higher the finesse of the Fabry-Perot filter that will be built with that particular mirror. In Equation 2, $n_0$ is the refractive index of the surrounding medium, $n_s$ is the refractive index of the substrate, $n_1$ is the refractive index of the first material, $n_2$ is the refractive index of the second material and N is the number of pairs in the Bragg stack. One instantiation of a distributed Bragg stack is a combination of $SiO_2$ and engineered amorphous Silicon for a central wavelength around 700 nm and a range from 540 nm to 1000 nm. A second instantiation is a combination of $SiO_2$ and SiGe for a central wavelength of 1500 nm and a bandwidth of 1000 nm, in casu from 1000 nm to 2000 nm. A consequence of using Bragg stacks for the mirror layers is an additional phase shift during the reflection of the light.

In use, the appearance of second order leakage is the result of the fact that a Fabry-Perot filter which is designed for wavelength $\lambda_j$ also passes incoming wavelengths that are a multiple of $\lambda_j$, called higher orders. However, only those higher order wavelengths that fall in the wavelength range for which both the Fabry-Perot filter and the underlying image sensor have a reasonable efficiency should be considered.

Manufacturing

Fabrication methods for manufacturing 1D or 2D Fabry-Perot filters can include successive patterning and etching steps which requires a large number of processing steps in order to produce k different thicknesses.

Planarity of the Image Sensor

In order to start with a well controlled state, it is important that the image sensor is planarized before the filter structure is built up. This can be done using a deposition step, followed by a CMP (Chemical Mechanical Polishing) step to remove all topography. By doing this, the rest of the processing does not depend anymore on the exact BEOL arrangements. The thickness and the material of this planarization layer can to some extent be taken into account during the design of the filter structure. However, this layer is not a part of the active filter structure and does not have a large effect on the filter itself, as long as the correct material transition (important for the refractive index) is correctly taken into account. As the Fabry-Perot filter will be deposited on top of this planarization layer, variation in this layer will be not propagated up, as long as the variation is sufficiently slow across the wafer (e.g. no sharp edges). As CMP is able to generate a surface with across wafer flatness and variations at the nanometer scale, this requirement can be fulfilled.

Deposition Tolerances and Other Variations

A variation in deposited thicknesses in the components of the Fabry-Perot filters, in casu the layers of the Bragg stack and the thickness of the cavity, will result in a mismatch between the designed filter and the produced filter. The effect of the variations on the thickness of the cavity is that: the thickness of all filters will be changed by more or less an equal amount, causing a shift of the spectral range to the right of the left of the theoretical design. This global shift in the selected wavelengths, either up or down, with respect to the designed filter location, can be tolerated if it is a small proportion of the spectral width of the passbands which can be one of the design parameters.

In addition to the wafer-wide deposition tolerance, there can be etch tolerances and other intra-die variations as well as inter-die variations. Traditionally this is mitigated by binning, selecting certain devices for certain wavelength ranges.

In case the etch processes that are being used to define are non-directional processes, the sharp edges that form the transition between one line filter and the next one, can show rounding. In some embodiments, the width of each filter can cover multiple columns of sensor elements in other cases just one or two sensor elements, in which case such corner rounding may have more effect on the passband.

Alignment Tolerances

When using standard IC processing techniques, alignment of filter structures on top of rows/columns of pixels with dimension of several microns per pixels is well within the possibilities of the state of the art. Therefore, alignment at the top level is not very critical.

Processing Hardware

Some of the method steps discussed above for image processing for example, may be implemented by logic in the form of hardware or, for example, in software using a processing engine such as a microprocessor or a programmable logic device (PLD's) such as a PLA (programmable logic array), PAL (programmable array logic), FPGA (field programmable gate array).

An example of a circuit with an embedded processor may be constructed as a VLSI chip around an embedded microprocessor which may be synthesized onto a single chip with the other components. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for accessing external storage e.g. via data networks. FIFO buffers may be used to decouple the processor from data transfer through these interfaces. The interface can provide network connections, i.e. suitable ports and network addresses, e.g. the interfaces may be in the form of network cards.

Software

Software programs may be stored in an internal ROM (read only memory) and/or on any other non-volatile memory, e.g. they may be stored in an external memory. Access to an external memory may be provided by conventional hardware which can include an external bus interface if needed, with address, data and control busses. Features of the method and apparatus of the present invention may be implemented as software to run on a processor. In particular image processing in accordance with the present invention may be implemented by suitable programming of the processor. The methods and procedures described above may be written as computer programs in a suitable computer language such as C and then compiled for the specific processor in the embedded design. For example, the software may be written in C and then compiled using a known compiler and known assembler. The software has code, which when executed on a processing engine provides the methods and image processor for the present invention. The software programs may be stored on any suitable machine readable medium such as magnetic disks, diskettes, solid state memory, tape memory, optical disks such as CD-ROM or DVD-ROM, etc. Other variations can be envisaged within the claims.

What is claimed is:

1. A spectral camera for producing a spectral output, the spectral camera comprising:
    an objective lens for producing an image;
    an optical duplicator for producing optical copies of the image on different optical channels, wherein at least some of the optical copies of the image produced by the optical duplicator are complete unsegmented copies of the entire image;
    an array of filters for passing a different passband of the optical spectrum for different ones of the optical channels;
    one or more sensor arrays arranged to detect the filtered image copies simultaneously on different parts of the one or more sensor arrays; and
    a field stop for defining an outline of the complete unsegmented copies of the entire image projected on the one or more sensor arrays, wherein the array of filters is integrated on the one or more sensor arrays and comprises thin films acting as fabry perot cavities having a thickness of half the wavelength of the desired transmission wavelength, wherein the passbands vary within a spectral range with a spectral resolution in steps of a first increment, with a change in spectral resolution to steps less than the first increment in a portion of the spectral range, wherein the one or more sensor arrays has a planar structure without perpendicular physical barriers for preventing cross talk between each of the adjacent optical channels, and wherein the outlines and alignments of the complete unsegmented copies of the entire image projected on the one or more sensor arrays are such that at least some adjacent ones of the complete unsegmented copies of the entire image fit together without leaving sensor elements unused by being obscured by such barriers.

2. The spectral camera of claim 1, wherein the array of filters is arranged such that for at least some of the image copies there is a spatial pattern of multiple different passbands within the part of the array for a respective image copy.

3. The spectral camera of claim 1, wherein at least some of the projected image copies are segments of the entire image, and the spectral camera further comprises a digital processing part for electrically processing the detected segments to stitch them together.

4. The spectral camera of claim 1, wherein the optical duplicator comprises an array of lenses.

5. The spectral camera of claim 1, wherein the array of filters and the optical duplicator are arranged to provide different magnification for different ones of the projected image copies.

6. The spectral camera of claim 1, wherein the array of filters is reconfigurable in use by swapping the array of filters integrated on the sensor array to use a different sensor array having a different array of filters.

7. The spectral camera of claim 1, wherein the field stop, the filters, and the duplicator are arranged to give the projected image copies a hexagonal outline.

8. The spectral camera of claim 1, wherein the field stop comprises a field lens.

9. The spectral camera of claim 1, wherein the one or more sensor arrays has a layout of circuit tracks in which these tracks are concentrated around the peripheries of the locations of the projections of the image copies.

10. The spectral camera of claim 1, wherein the arrangement of image copies and the selection of the passbands is such that there is a variation in any one or more of: which passbands are detected at different parts of the image, a spectral resolution at different parts of the image, a spectral resolution at different parts of a spectral range, a spatial resolution of the detection at different parts of the image, and spatial resolution of the detection at different passbands.

11. A method of operating a spectral camera having an objective lens for producing an image, an optical duplicator for producing optical copies of the image on different optical channels, at least some of the optical copies of the image produced by the optical duplicator being complete unsegmented copies of the entire image, an array of filters for passing a different passband of the optical spectrum for different ones of the optical channels, and one or more sensor arrays arranged to detect the filtered image copies simultaneously on different parts of the one or more sensor arrays, the camera also having a field stop for defining an outline of the complete unsegmented copies of the entire image projected on the one or more sensor arrays, the array of filters integrated on the one or more sensor arrays and comprising thin films acting as fabry perot cavities having a thickness of half the wavelength of the desired transmission wavelength, wherein the passbands vary within a spectral range with a spectral resolution in steps of a first increment, with a change in spectral resolution to steps less than the first increment in a portion of the spectral range, and the one or more sensor arrays having a planar structure without perpendicular physical barriers for preventing cross talk between each of the adjacent optical channels, the method comprising:
    carrying out a preliminary registration to set the outlines and alignments of the complete unsegmented copies of the entire image projected on the one or more sensor arrays such that at least some adjacent ones of the complete unsegmented copies of the entire image fit tightly together without leaving sensors unused by being obscured by such barriers;

reading out the projected image copies at the different passbands in a single frame time; and storing an image cube of the sensed projected image copies.

12. The method of claim 11, further comprising swapping the sensor array integrated with the array of filters for one having a different array of filters.

13. The method of claim 11, wherein the spectral camera is arranged so that at least some of the projected image copies are segments of the entire image, and the method further comprises electrically processing the detected segments to stitch them together.

14. A method of configuring a spectral camera during manufacture, the spectral camera having an objective lens for producing an image, an optical duplicator for producing optical copies of the image on different optical channels, at least some of the optical copies of the image produced by the optical duplicator being complete unsegmented copies of the entire image, an array of filters for passing a different passband of the optical spectrum for different ones of the optical channels, and one or more sensor arrays arranged to detect the filtered image copies simultaneously on different parts of the one or more sensor arrays, the camera also having a field stop for defining an outline of the complete unsegmented copies of the entire image projected on the one or more sensor arrays, the array of filters integrated on the one or more sensor arrays and comprising thin films acting as fabry perot cavities having a thickness of half the wavelength of the desired transmission wavelength, the one or more sensor arrays having a planar structure without perpendicular physical barriers for preventing cross talk between each of the adjacent optical channels, and the outlines and alignments of the complete unsegmented copies of the entire image projected on the one or more sensor arrays being such that at least some adjacent ones of the complete unsegmented copies of the entire image fit together without leaving sensors unused by being obscured by such barriers, the method comprising:

selecting how many complete unsegmented copies of the entire image to provide and their spatial arrangement on the sensor array;

selecting which passbands to use, and their spatial arrangement on the complete unsegmented copies of the entire image, the passbands selected such that the passbands vary within a spectral range with a spectral resolution in steps of a first increment, with a change in spectral resolution to steps less than the first increment in a portion of the spectral range; and manufacturing integrated layers on the one or more sensor arrays to form the array of filters according to the selected passbands and their spatial arrangement.

15. The method of claim 14, wherein the passbands and their spatial arrangement are selected such that there is a variation in any one or more of: which passbands are detected at different parts of the image, a spectral resolution, a spatial resolution of the detection at different parts of the image, and spatial resolution of the detection at different passbands.

16. The method of claim 14, wherein the passbands and their spatial arrangement are selected such that for at least some of the image copies, a part of the array for a respective one of the image copies has a spatial pattern of multiple different ones of the passbands.

17. The spectral camera of claim 1, wherein the array of filters is configured to pass NB different passbands of the optical spectrum for different ones of the optical channels, and wherein the optical duplicator comprises NB lens systems, at least some of the NB lens systems configured to produce one complete unsegmented copy of the entire image.

18. The spectral camera of claim 1, wherein the passbands vary between 400 nm to 900 nm with a spectral resolution in steps of 50 nm, with a change in spectral resolution to a step of less than 50 nm between 520 nm and 570 nm.

19. The method of claim 11, wherein the passbands vary between 400 nm to 900 nm with a spectral resolution in steps of 50 nm, with a change in spectral resolution to a step of less than 50 nm between 520 nm and 570 nm.

20. The method of claim 14, wherein the passbands vary between 400 nm to 900 nm with a spectral resolution in steps of 50 nm, with a change in spectral resolution to a step less than 50 nm between 520 nm and 570 nm.

* * * * *